US012090680B2

(12) United States Patent
Mori et al.

(10) Patent No.: US 12,090,680 B2
(45) Date of Patent: Sep. 17, 2024

(54) SHEET PROCESSING MACHINE

(71) Applicant: DUPLO SEIKO CORPORATION, Kinokawa (JP)

(72) Inventors: Masahiko Mori, Kinokawa (JP); Takaaki Maeda, Kinokawa (JP)

(73) Assignee: Duplo Seiko Corproation, Kinokawa (JP)

( * ) Notice: Subject to any disclaimer, the term of this patent is extended or adjusted under 35 U.S.C. 154(b) by 566 days.

(21) Appl. No.: 17/401,995

(22) Filed: Aug. 13, 2021

(65) Prior Publication Data

US 2022/0055852 A1 Feb. 24, 2022

(30) Foreign Application Priority Data

Aug. 18, 2020 (JP) ................................ 2020-138154

(51) Int. Cl.

| | |
|---|---|
| ***B26F 1/38*** | (2006.01) |
| ***B26D 5/00*** | (2006.01) |
| ***B26D 5/02*** | (2006.01) |
| ***B26F 1/08*** | (2006.01) |
| ***B65H 5/06*** | (2006.01) |
| ***B65H 7/02*** | (2006.01) |

(52) U.S. Cl.

CPC ........... *B26F 1/3813* (2013.01); *B26D 5/005* (2013.01); *B26D 5/02* (2013.01); *B26F 1/08* (2013.01); *B65H 5/062* (2013.01); *B65H 7/02* (2013.01)

(58) Field of Classification Search

CPC ........... B26F 1/3813; B26D 5/02; B65H 7/02; B65H 5/062

See application file for complete search history.

(56) References Cited

U.S. PATENT DOCUMENTS 6,447,189 B1 * 9/2002 Omura ..................... B26D 5/02 400/315
2005/0103179 A1 * 5/2005 Mori .................... B26D 7/2628 83/628

FOREIGN PATENT DOCUMENTS

| | | | |
|---|---|---|---|
| EP | 1063097 | A1 | 12/2000 |
| JP | 01-002896 | A | 1/1989 |
| JP | 2007319969 | A | 12/2007 |

(Continued)

OTHER PUBLICATIONS

The extended European Search Report issued on Dec. 21, 2021, by the European Patent Office in corresponding European Application No. 21191516.0. (8 pages).

(Continued)

*Primary Examiner* — Jeremy R Severson
(74) *Attorney, Agent, or Firm* — BUCHANAN INGERSOLL & ROONEY PC

(57) ABSTRACT

A sheet processing machine includes a processing device including a processing blade; a drive shaft related to an operation of the processing blade; a shaft drive motor; a rotational position detection unit that detects a rotational position of the drive shaft; a width direction drive motor that moves the processing device; and a control unit, in which the control unit controls the shaft drive motor so that the drive shaft is at a predetermined rotational position based on the rotational position of the drive shaft detected by the rotational position detection unit, and controls the width direction drive motor so that the processing device moves to a predetermined processing position while the drive shaft maintains the predetermined rotational position.

14 Claims, 18 Drawing Sheets

(56) References Cited

FOREIGN PATENT DOCUMENTS

| | | | |
|---|---|---|---|
| JP | 2013103311 | A | 5/2013 |
| JP | 2015-120213 | A | 7/2015 |

OTHER PUBLICATIONS

Notice of Reasons for Refusal issued in Japanese Patent Application No. 2020-138154, mailed on Oct. 3, 2023, with English Translation (6 pages).

* cited by examiner

SHEET PROCESSING MACHINE

CROSS-REFERENCE TO RELATED APPLICATION

This application claims priority to Japanese Patent Application No. 2020-138154 filed on Aug. 18, 2020, the entire content of which is incorporated herein by reference for all purposes.

BACKGROUND

Field

The present disclosure relates to a sheet processing machine.

Description of the Prior Art

Patent Document 1 (Japanese Patent Application Laid-Open No. 2007-319969) discloses a sheet processing machine including a processing device having a processing blade that performs processing on a sheet along a conveyance direction.

In the sheet processing machine of Patent Document 1, when moving the processing device in a width direction orthogonal to the conveyance direction to position the processing device with respect to a processing reference position, position shift may occur every time the processing device is moved since the position of the processing blade of the processing device is not stable. That is, in the sheet processing machine of Patent Document 1, it is difficult to position the processing blade of the processing device with high accuracy, and a slight shift may occur in a processing position.

SUMMARY

Therefore, a technical problem to be solved by the present disclosure is to provide a sheet processing machine capable of positioning a processing blade of a processing device with high accuracy.

In order to solve the above technical problems, the present disclosure provides the following sheet processing machine.

That is, a sheet processing machine according to the present disclosure is the sheet processing machine that processes a sheet while conveying the sheet in a conveyance direction, the sheet processing machine including:

a processing device including a processing blade;

a drive shaft that extends in a width direction orthogonal to the conveyance direction and is related to an operation of the processing blade;

a shaft drive motor that drives the drive shaft;

a rotational position detection unit that detects a rotational position of the drive shaft;

a width direction drive motor that moves the processing device in the width direction; and a control unit that controls operations of the shaft drive motor and the width direction drive motor, in which the control unit controls the shaft drive motor so that the drive shaft is at a predetermined rotational position based on the rotational position of the drive shaft detected by the rotational position detection unit, and controls the width direction drive motor so that the processing device moves to a predetermined processing position while the drive shaft maintains the predetermined rotational position.

According to the above configuration, the processing device is positioned at the predetermined processing position while the drive shaft maintains the predetermined rotational position, and thus the position of the processing blade of the processing device becomes stable, and the processing blade of the processing device can be positioned with high accuracy.

DETAILED DESCRIPTION OF THE PREFERRED EMBODIMENTS

Hereinafter, a sheet processing machine 1 will be described with reference to the drawings. For the sake of convenience of description, an upper side and a lower side of a sheet 2 with a conveyance path 20 therebetween are referred to as an "upper side" and a "lower side", respectively, and a direction orthogonal to a conveyance direction S (a horizontal direction orthogonal to the conveyance direction 5) is referred to as a width direction W. In addition, a "right side" and a "left side" are defined as viewed from the upstream side in the conveyance direction S. In the present disclosure, the sheet 2 is, for example, a paper, a resin thin plate, a film, or the like.

(Overall Configuration of Sheet Processing Machine)

Figure 1:
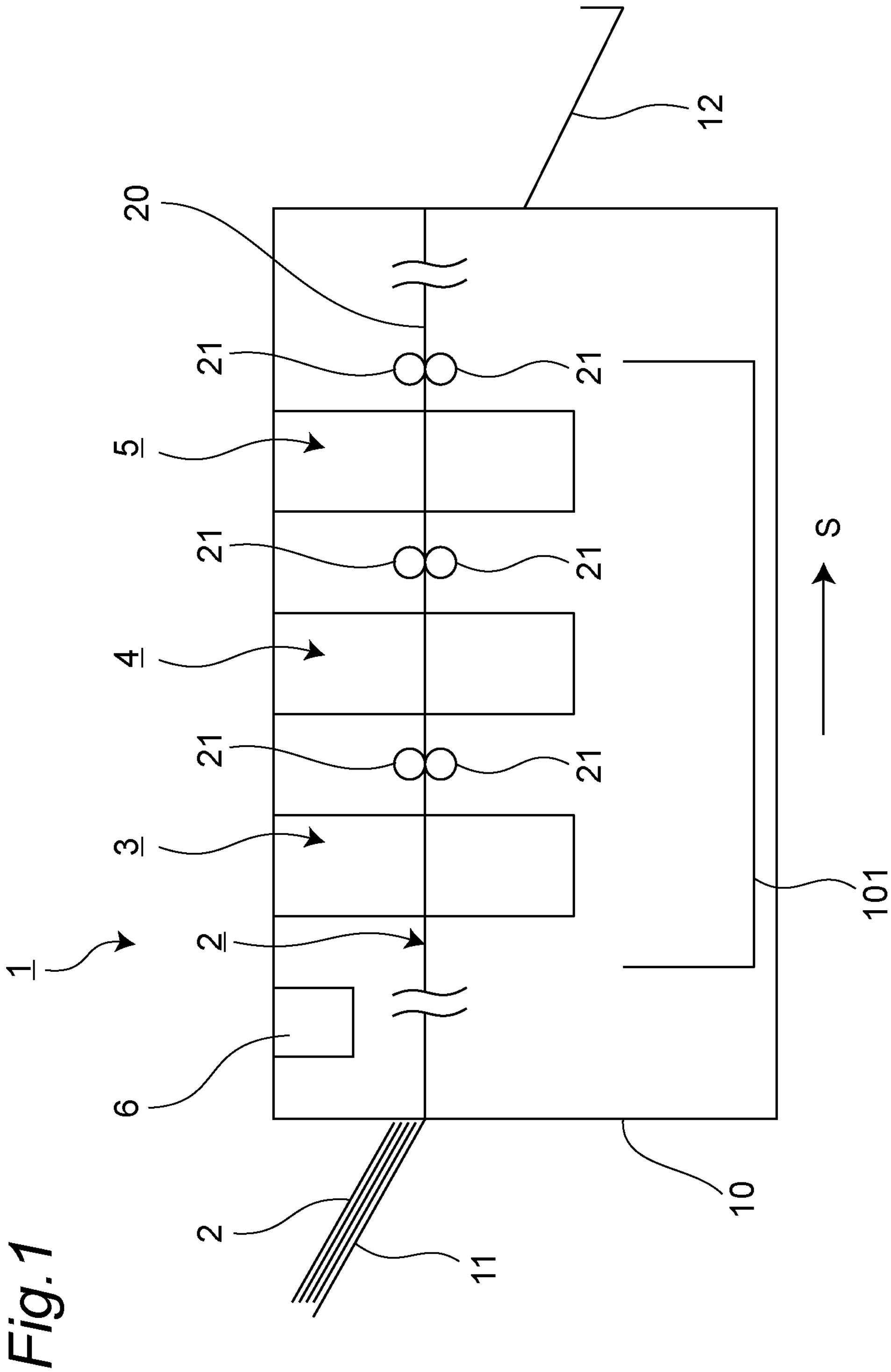
FIG. 1 is a longitudinal cross-sectional view schematically illustrating an overall configuration of a sheet processing machine according to one embodiment of the present disclosure.

As illustrated in FIG. 1, the sheet processing machine 1 includes a supply tray 11 and a discharge tray 12 on the upstream side and the downstream side of the conveyance path 20 of a main body 10, respectively.

The main body 10 includes a suction type conveyance belt that sends the sheets 2 placed on the supply tray 11 one by one to the main body 10. In the main body 10, the sheet 2 is conveyed in the conveyance direction S by a sheet conveying unit including a plurality of pairs of rollers 21 driven by a plurality of conveyance motors (details will be described later) independent for each predetermined region. Therefore, the plurality of pairs of rollers 21 are arranged side by side in the conveyance direction S, thereby forming the conveyance path 20 extending in the conveyance direction S. On the conveyance path 20, a first processing unit 3, a second processing unit 4, a third processing unit 5, and the like are provided from the upstream side of the conveyance path 20 via a conveyance correction unit, an information reading unit, a rejection unit, and the like (all not illustrated). The first processing unit 3, the second processing unit 4, and the third processing unit 5 are attached to the main body 10. The sheet processing machine 1 has a trash box 101, at the bottom portion of the main body 10, for accommodating chips generated by the processing of the sheet 2.

Figure 2:
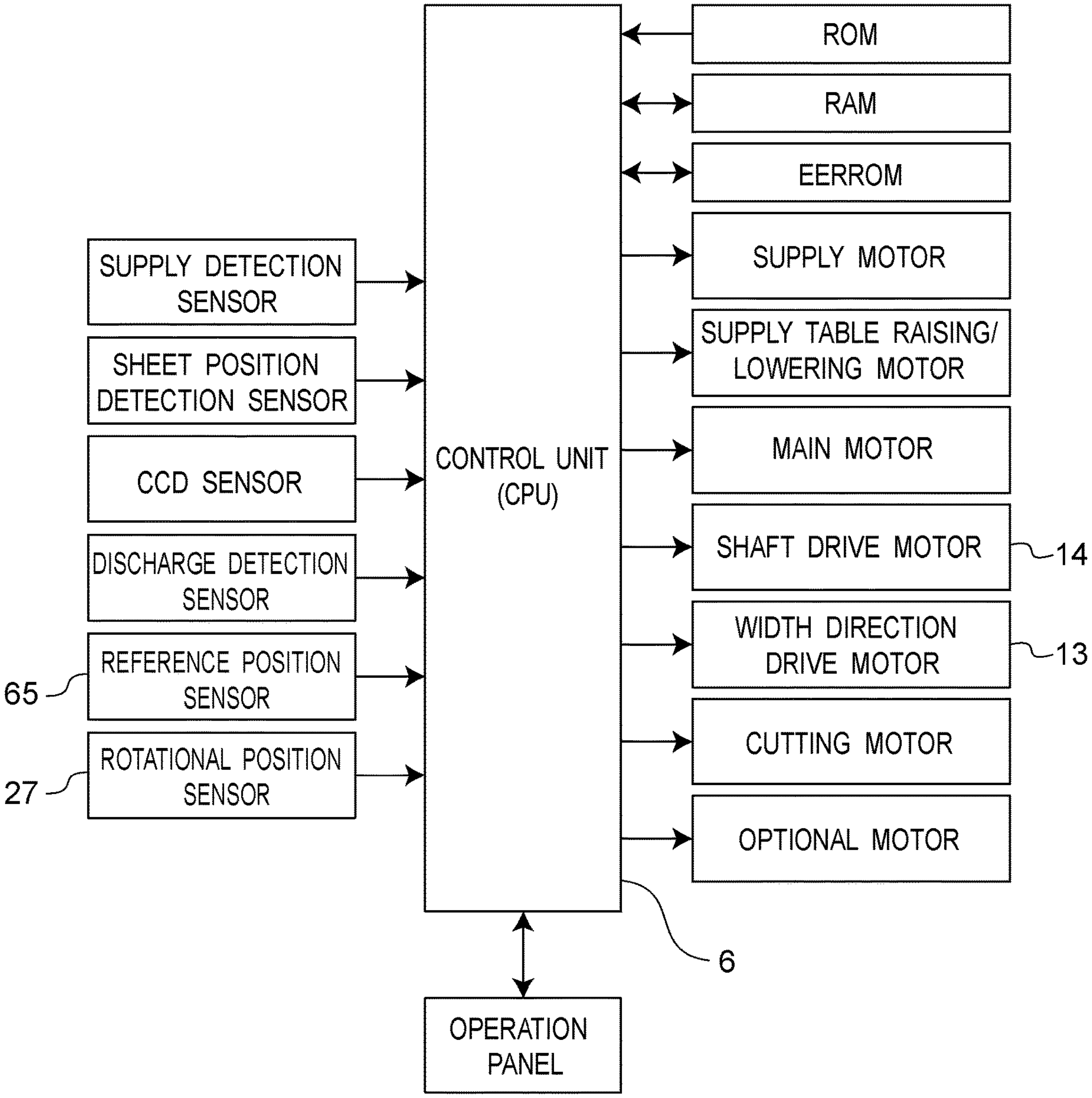
FIG. 2 is a functional block diagram of the sheet processing machine illustrated in FIG. 1.

The main body 10 includes a control unit 6 for controlling various operations in the sheet processing machine 1. FIG. 2 is a functional block diagram of the sheet processing machine 1. The control unit 6 is, for example, a central processing unit (CPU), and controls various operations in the sheet conveying unit, the first processing unit 3, the second processing unit 4, the third processing unit 5, and the like. The control unit 6 controls a width direction drive motor 13 and a shaft drive motor 14 to be described later. The control unit 6 controls various arithmetic processes, processing processes, and determination processes through various memories and various input devices and output devices.

Various memories such as a ROM (read-only memory) storing various programs, a RAM (random access memory) storing various information, and an EEPROM (electrically erasable and writable memory) are connected to the control unit 6. An operation display unit including an input unit such as a button or a switch and a display unit such as a display, and an operation panel including a notification unit that notifies occurrence of an error by sound or light are connected to the control unit 6. The operation display unit serves as an input unit for the operator to input data such as the number of sheets and processing process information such as a processing position.

The control unit 6 is connected to a sheet conveyance drive source such as a supply motor, a supply table raising/lowering motor, and a main motor, and a sheet processing drive source such as a width direction drive motor 13, a shaft drive motor 14, a cutting motor, and an optional motor. Various sensors such as a supply detection sensor, a sheet position detection sensor, a CCD sensor, a discharge sensor, a rotational position sensor 27, and a reference position sensor 65 are connected to the control unit 6.

The width direction drive motor 13, the shaft drive motor 14, and the like are, for example, stepping motors. In the stepping motor, the motor shaft rotates in a predetermined step unit by providing a pulse signal, and angle and speed of rotation can be accurately controlled, so that the processing position of the processing device and the rotational position of the drive shaft 35 can be controlled at high speed and with high accuracy.

The control unit 6 detects, in cooperation with the rotational position sensor 27 to be described later, a rotational position of a portion-to-be-detected 72 that is fixed to one end 39 of the drive shaft 35 and rotates integrally with the drive shaft 35, and controls the shaft drive motor 14 so that the rotational position of the drive shaft 35 is at a predetermined rotational position. The control unit 6 detects a processing reference position of the processing device 40, 50 in cooperation with the reference position sensor 65 to be described later, and controls the width direction drive motor 13 so that the processing device 40, 50 moves to a predetermined processing position based on the processing reference position.

(Processing Unit)

Figure 3:
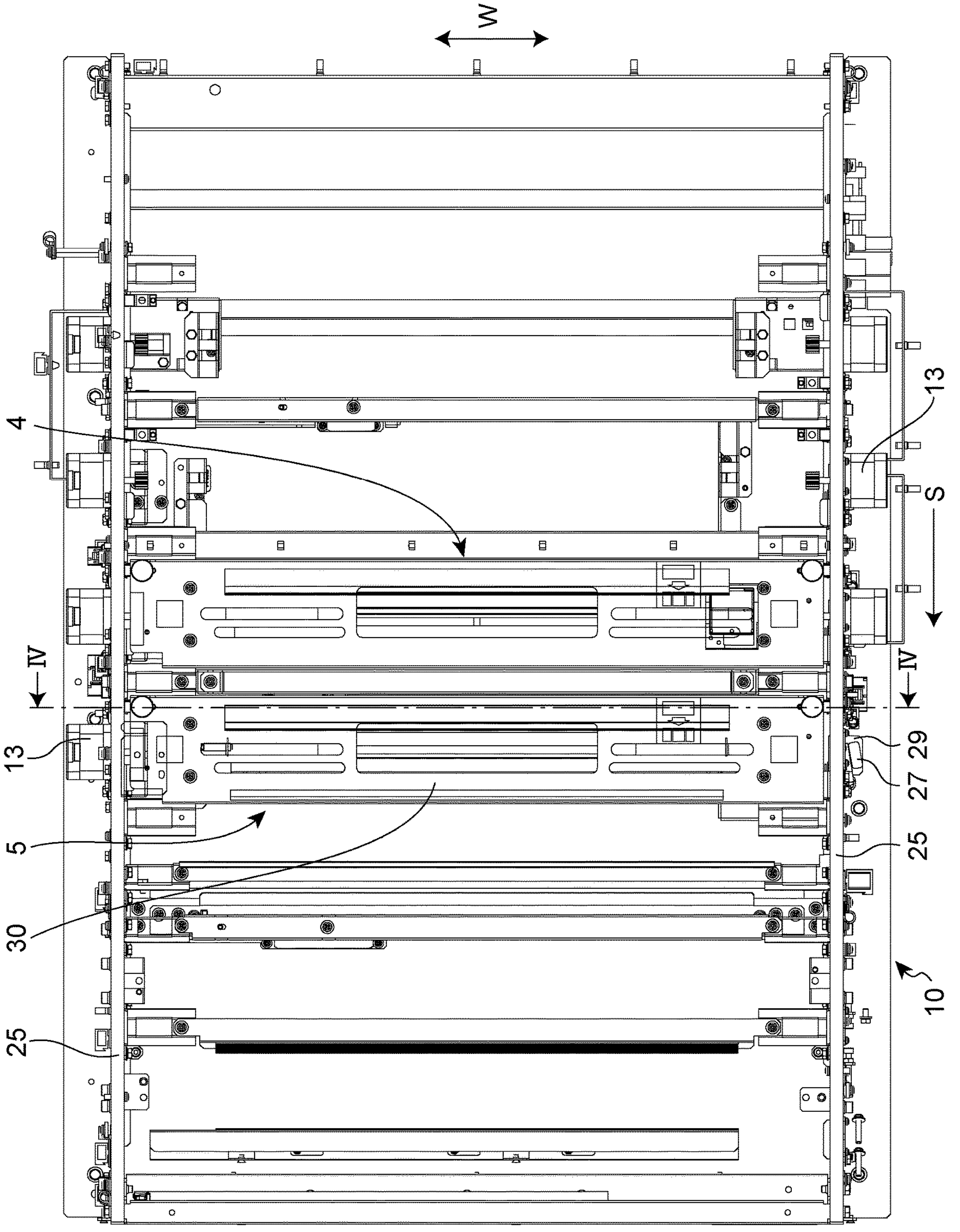
FIG. 3 is a schematic plan view of a main part of the sheet processing machine illustrated in FIG. 1 as viewed from above.

FIG. 3 is a schematic plan view of a main part of the sheet processing machine 1 illustrated in FIG. 1 as viewed from above. As illustrated in FIG. 3, the sheet processing machine 1 includes a plurality of processing units, for example, the first processing unit 3 (not illustrated in FIG. 3), the second processing unit 4, and the third processing unit 5. The first processing unit 3, the second processing unit 4, and the third processing unit 5 are configured to be detachable from main body side plates 25 and 25 located on the left side and the right side of the main body 10. The width direction drive motors 13 and 13 located on the left side and the right side are attached to outer side surfaces of the main body side plates 25 and 25 located on the left side and the right side, respectively. In FIG. 3, illustrations of some width direction drive motors 13 are omitted. The shaft drive motor 14 illustrated in FIG. 2 but not illustrated in FIG. 3 is attached to, for example, the outer surface of the main body side plate 25 located on the right side (the other end side).

For example, the first processing unit 3 performs perforation processing for forming a perforation along the conveyance direction of the sheet 2, the second processing unit 4 performs crease processing for forming a crease along the conveyance direction of the sheet 2, and the third processing unit 5 performs slit processing along the conveyance direction of the sheet 2. Hereinafter, the third processing unit 5 will be described, but the basic configuration is the same for the other processing units, that is, the first processing unit 3 and the second processing unit 4. In FIG. 3, the width direction drive motor 13 corresponding to the third processing unit 5 is illustrated on the right side, but the width direction drive motor 13 located on the left side, that is, located on the rotational position sensor 27 side is not illustrated.

Figure 4:
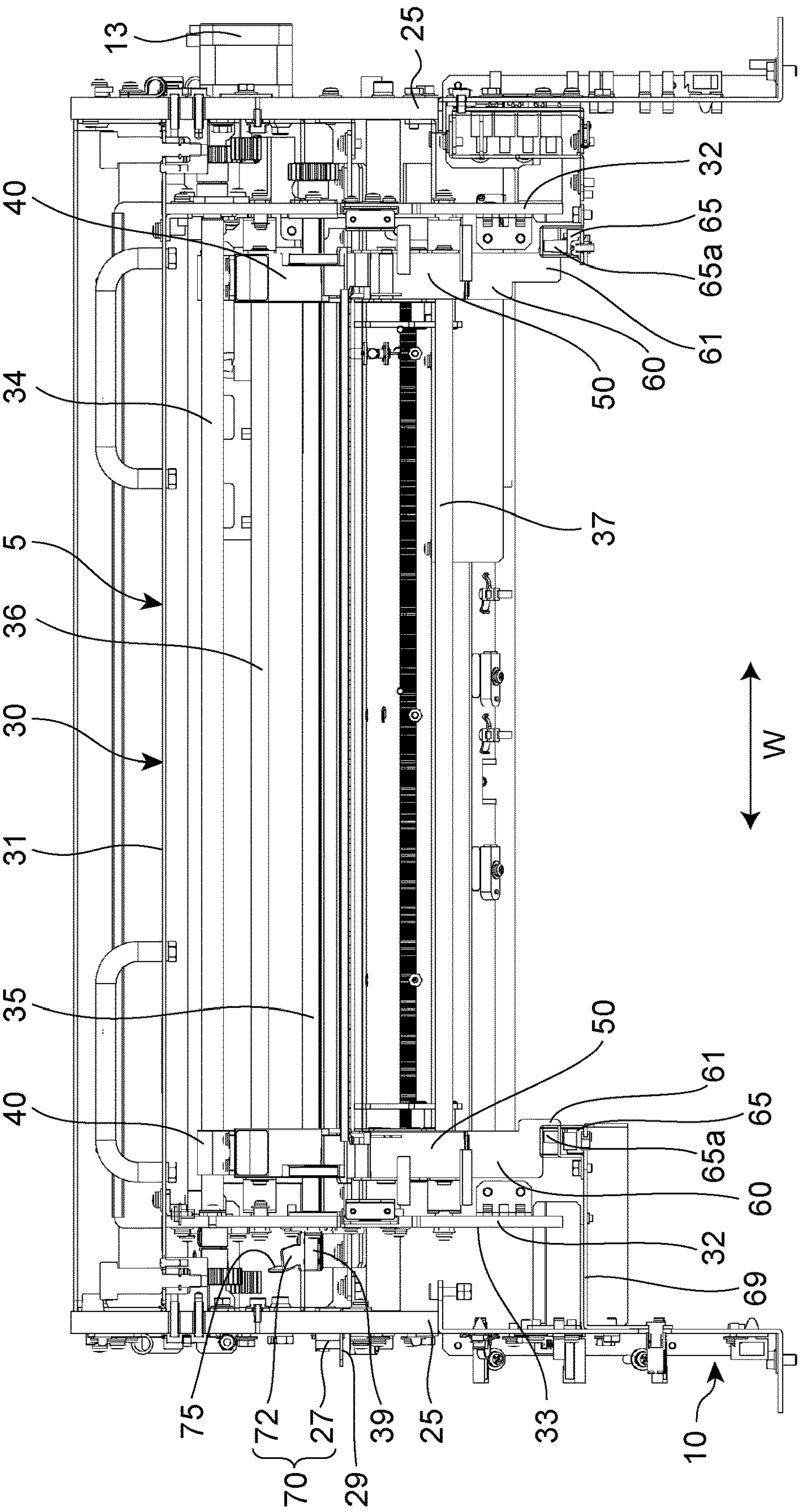
FIG. 4 is a cross-sectional view taken along line Iv-Iv of FIG. 3.

FIG. 4 is a cross-sectional view taken along line Iv-Iv of FIG. 3. As illustrated in FIG. 4, the third processing unit 5 includes a unit housing 30, one and the other screw shafts 34 and 34, a drive shaft 35, a first guide shaft 36, a second guide shaft 37, upper processing devices 40 and 40 located on the left side and the right side, and lower processing devices 50 and 50 located on the left side and the right side.

The unit housing 30 includes a unit upper plate 31 and unit side plates 32 and 32 located on the left side and the right side. The unit side plate 32 has a unit side surface 33 on its outer surface. The one and the other screw shafts 34 and 34, the drive shaft 35, the first guide shaft 36, and the second guide shaft 37 are supported by the unit side plates 32 and 32 located on the left side and the right side, and are arranged to extend in parallel in the width direction W between the unit side plates 32 and 32 located on the left side and the right side. The one and the other screw shafts 34 and 34 are provided at the same height position in the upper part of the internal space of the unit housing 30. The first guide shaft 36 is provided below the one and the other screw shafts 34 and 34. The drive shaft 35 is provided below the first guide shaft 36. The second guide shaft 37 is provided below the drive shaft 35.

The upper processing device 40 and the lower processing device 50 located on the left side are configured to be integrated. The one screw shaft 34, the first guide shaft 36, the second guide shaft 37, and the drive shaft 35 are used to operate the upper processing device 40 and the lower processing device 50 located on the left side. The one screw shaft 34 is driven by the width direction drive motor 13 located on the left through a width direction drive mechanism such as a gear. When the one screw shaft 34 rotates, the upper processing device 40 and the lower processing device 50 located on the left side move in the width direction W along the first guide shaft 36 and the second guide shaft 37.

The upper processing device 40 located on the left side has an upper housing 41. The one screw shaft 34 is screwed into an upper portion of the upper housing 41, and when the one screw shaft 34 rotates, the upper housing 41 moves in the width direction W along the first guide shaft 36. The lower processing device 50 located on the left side has a lower housing 51. The lower housing 51 is connected to the upper housing 41. Therefore, the lower housing 51 moves in the width direction W integrally with the upper housing 41 along the second guide shaft 37.

The upper processing device 40 and the lower processing device 50 located on the right side are configured to be integrated. The other screw shaft 34, the first guide shaft 36 and the second guide shaft 37, and the drive shaft 35 are used to operate the upper processing device 40 and the lower processing device 50 located on the right side. The other screw shaft 34 is driven by the width direction drive motor 13 located on the right through a width direction drive mechanism such as a gear. When the other screw shaft 34 rotates, the upper processing device 40 and the lower processing device 50 located on the right side move in the width direction W along the first guide shaft 36 and the second guide shaft 37.

The upper processing device 40 located on the right side has an upper housing 41. The other screw shaft 34 is screwed into the upper portion of the upper housing 41, and when the other screw shaft 34 rotates, the upper housing 41 moves in the width direction W along the first guide shaft 36. The lower processing device 50 located on the right side has a lower housing 51. The lower housing 51 is connected to the upper housing 41. Therefore, the lower housing 51 moves in the width direction W integrally with the upper housing 41 along the second guide shaft 37.

Each of the upper housings 41 and 41 located on the left side and the right side has, for example, an upper rotary blade 45. Each of the lower housings 51 and 51 located on the left side and the right side has, for example, a lower rotary blade 55. The upper rotary blade 45 and the lower rotary blade 55 are processing blades. The upper rotary blade 45 is a rotary blade that rotates together with the drive shaft 35. The lower rotary blade 55 is a rotary blade that comes in sliding contact with the upper rotary blade 45 and rotates following the rotation of the upper rotary blade 45.

The upper rotary blade 45 and the lower rotary blade 55 form a processing acting portion C.

A key groove extending in the width direction W is formed on the outer peripheral surface of the drive shaft 35, and a key that fits into the key groove is provided on an inner peripheral surface of a boss portion of the upper rotary blade 45. As a result, the boss portion of the upper rotary blade 45 is fitted to an outer peripheral surface of the drive shaft 35 to be freely movable in the width direction W, and is key-coupled to the drive shaft 35 so as to rotate integrally with the drive shaft 35.

The lower processing devices 50 and 50 located on the left side and the right side respectively have extending portions 60 and 60. The extending portion 60 extends downward from a lower portion of the lower processing device 50. The extending portion 60 has a reference end 61 serving as the processing reference position. The reference end 61 is formed at the lower end of the extending portion 60. A reference position sensor 65 is provided to detect the reference end 61. The reference position sensor 65 is supported by the main body side plate 25 by a second stay 69. The reference position sensor 65 is a transmissive optical sensor including a pair of light emitting unit 65*a* and light receiving unit 65*b*. In the reference position sensor 65, when the reference end 61 passes between the light emitting unit 65*a* and the light receiving unit 65*b*, the reference end 61 is detected by measurement light emitted from the light emitting unit 65*a* being blocked or by the blocked measurement light entering the light receiving unit 65*b*.

(Rotational Position Detection Unit)

Figure 5:
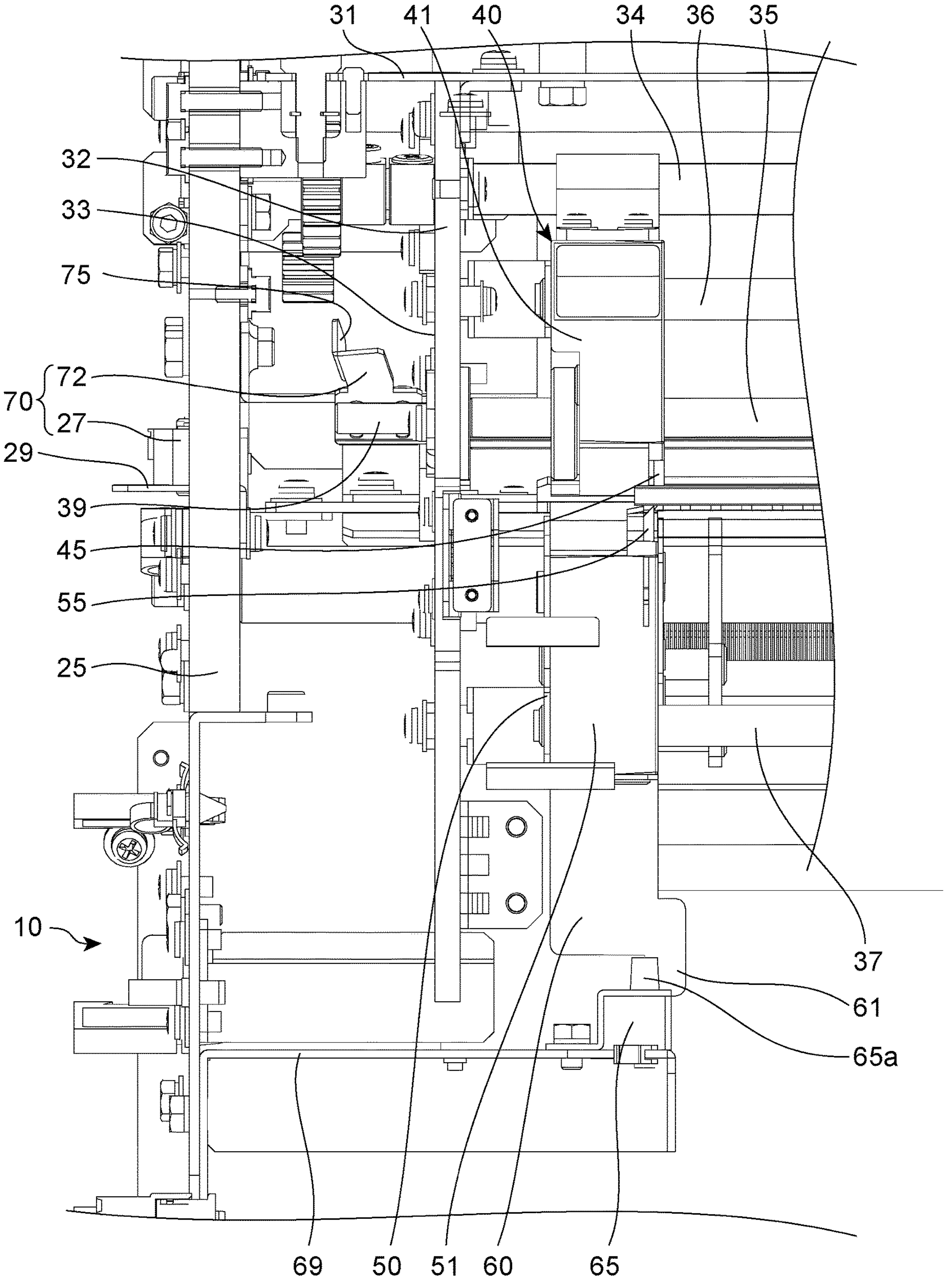
FIG. 5 is an enlarged view of a main part of the sheet processing machine illustrated in FIG. 4.
Figure 6:
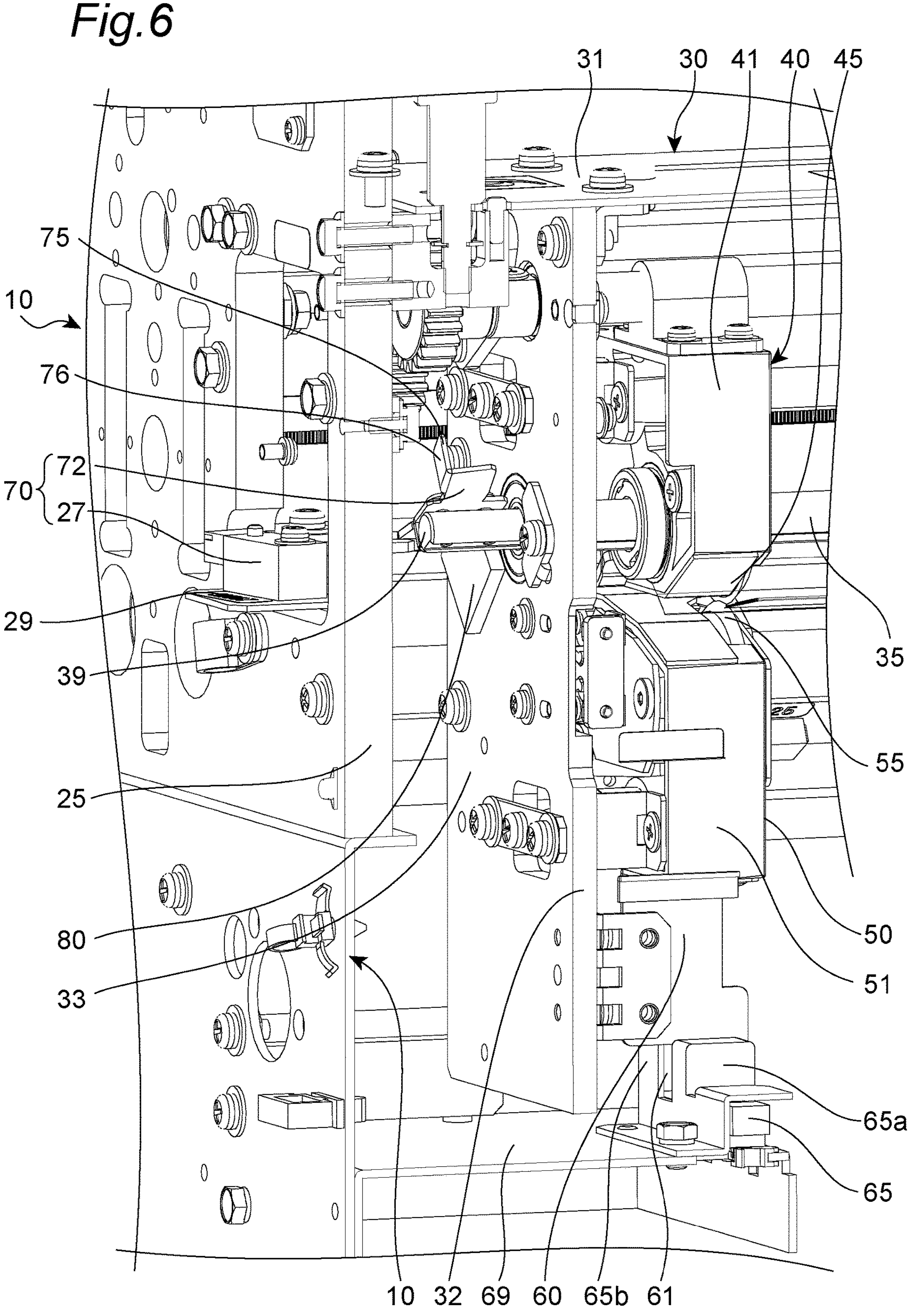
FIG. 6 is a perspective view of the main part illustrated in FIG. 5.
Figure 7:
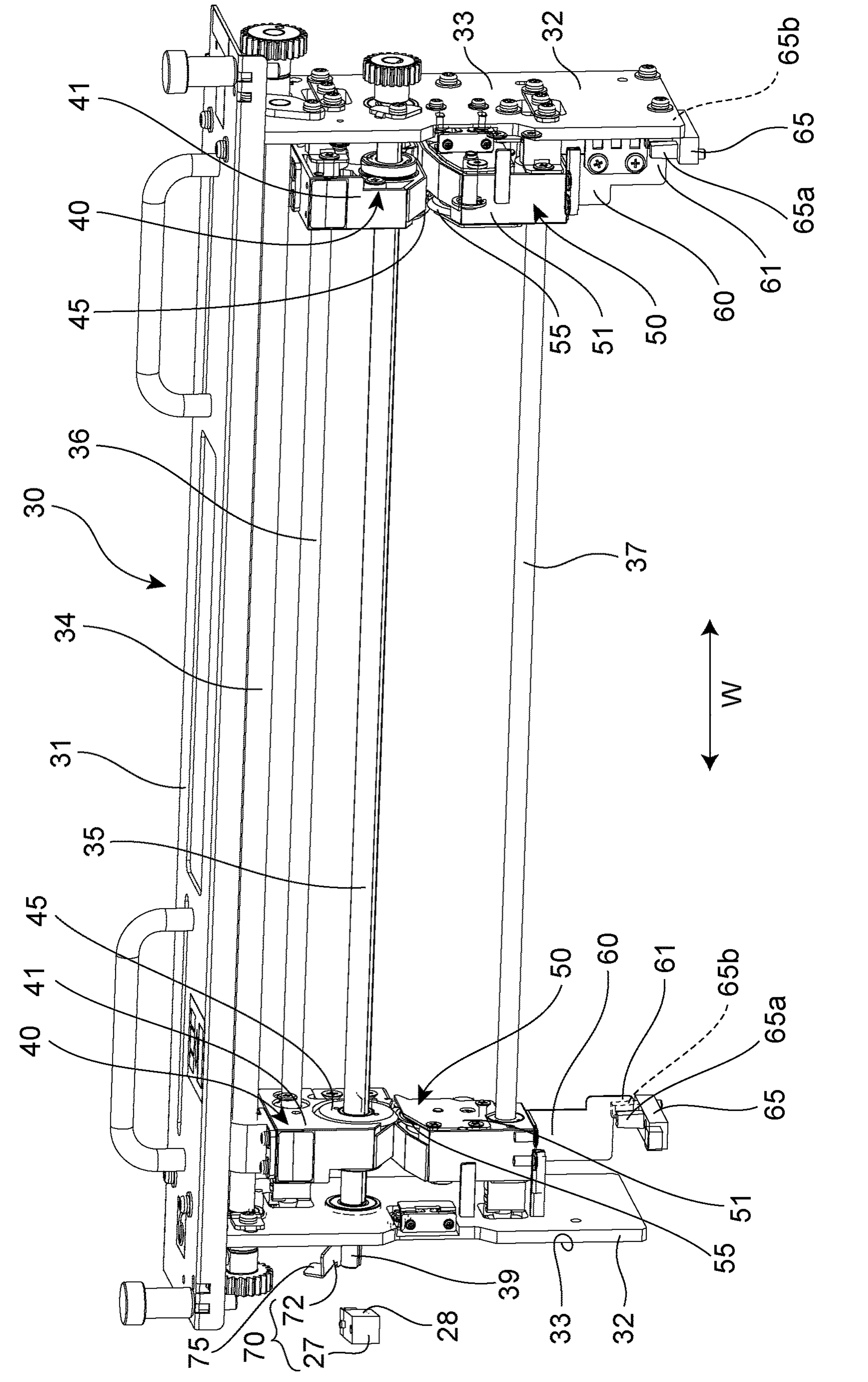
FIG. 7 is a perspective view of a third processing unit in the sheet processing machine illustrated in FIG. 1.
Figure 8:
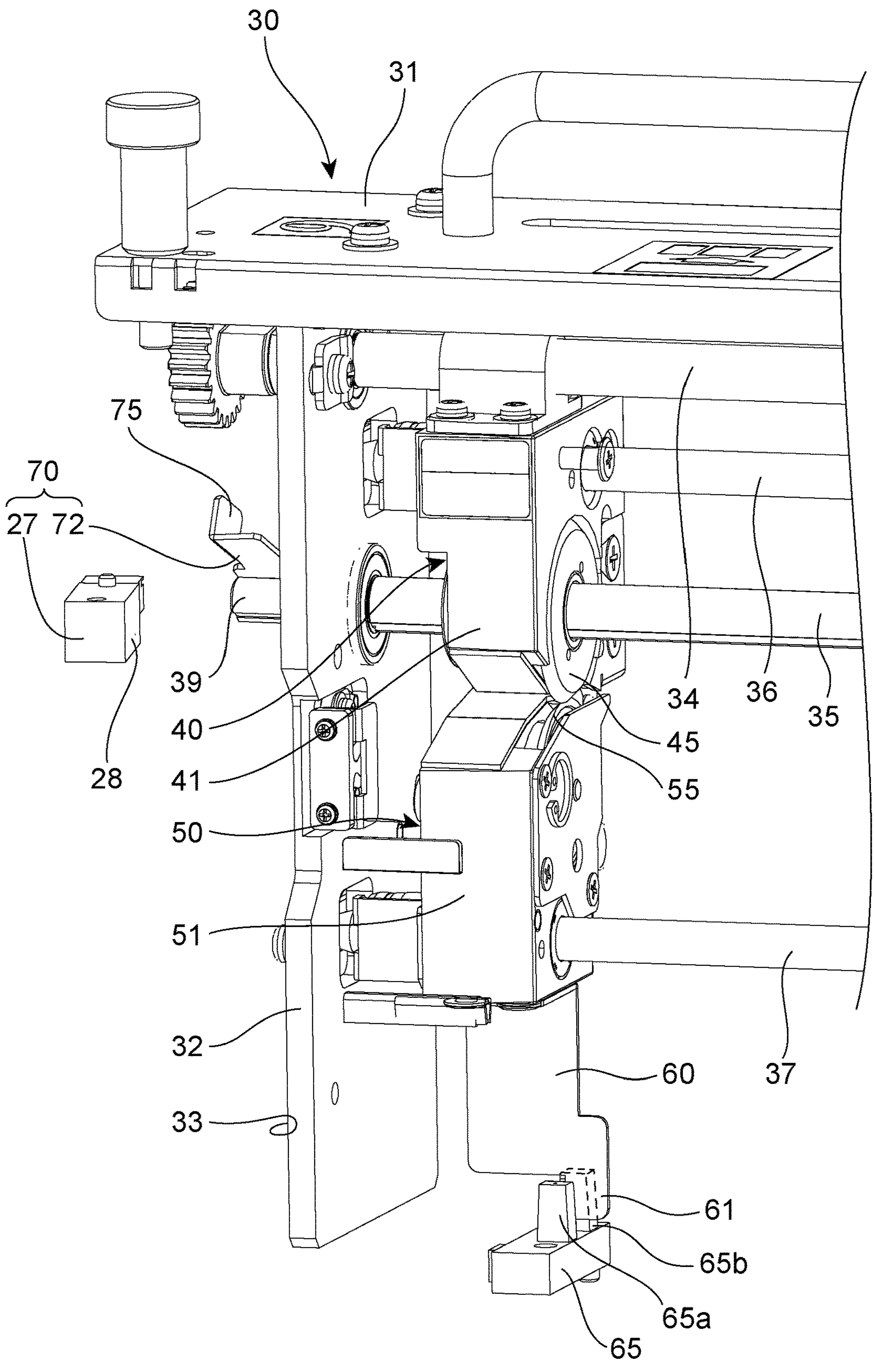
FIG. 8 is an enlarged view of a main part of the third processing unit illustrated in FIG. 7.
Figure 9:
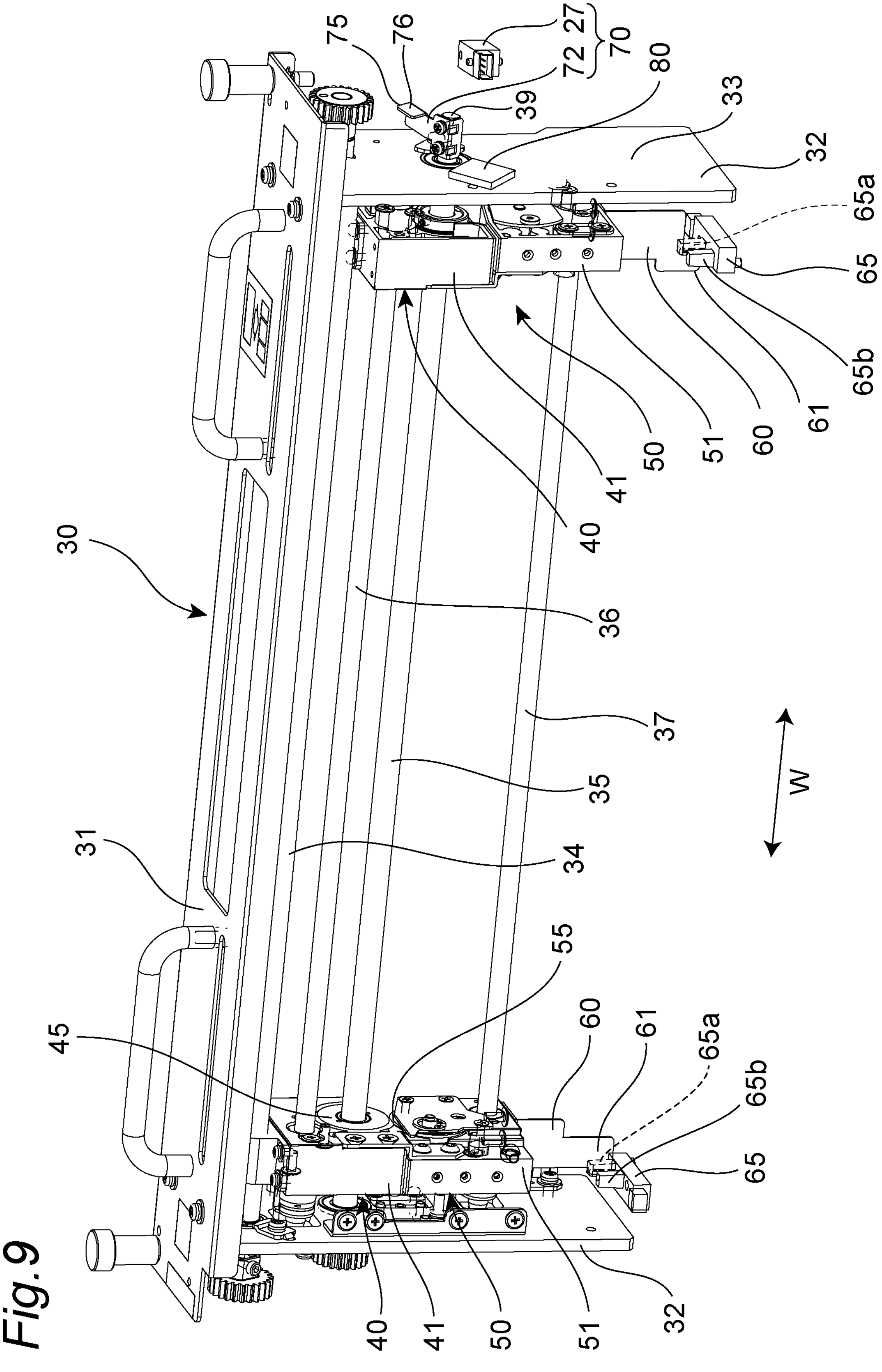
FIG. 9 is a perspective view of the third processing unit illustrated in FIG. 7 as viewed from the opposite side.
Figure 10:
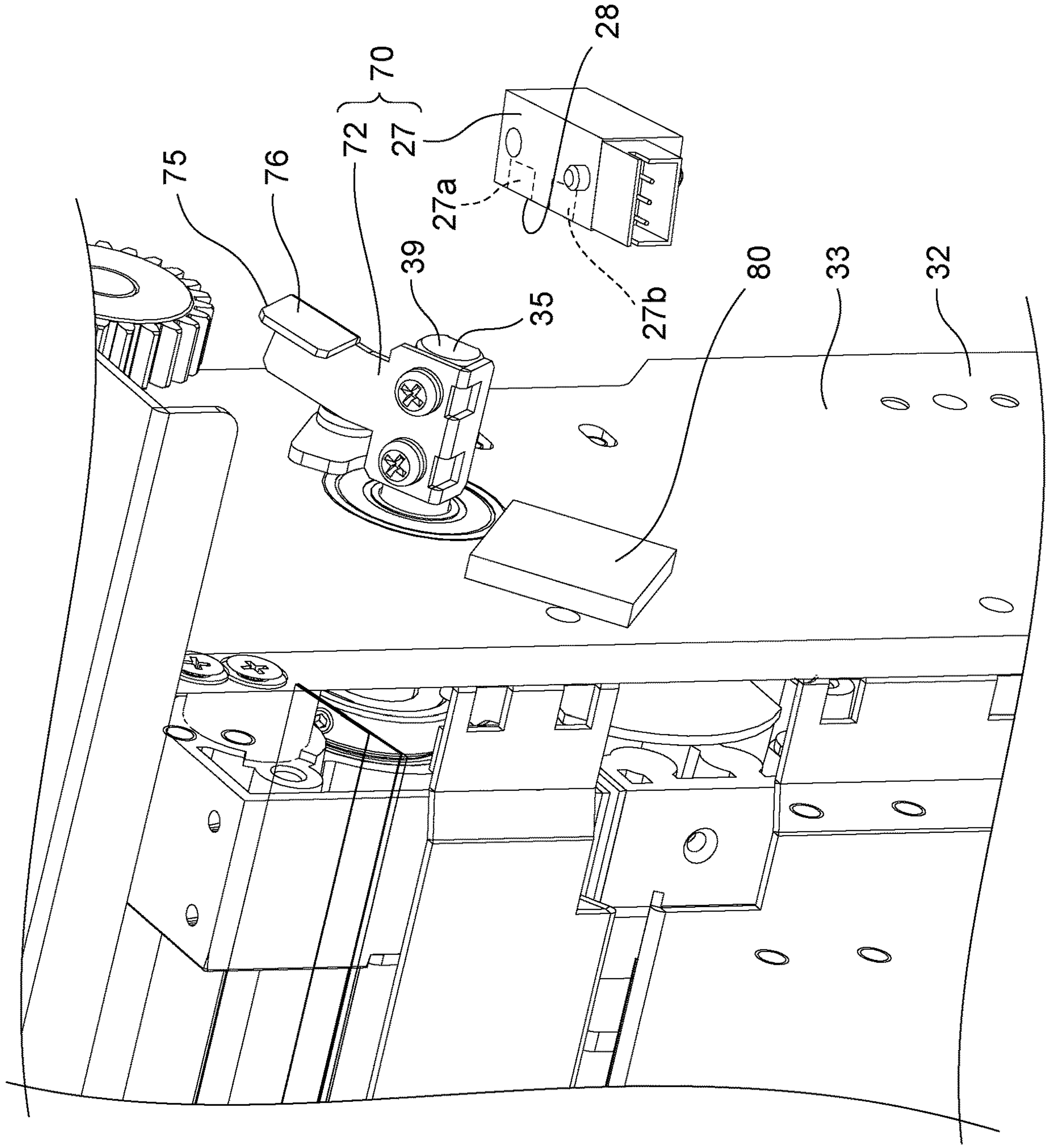
FIG. 10 is an enlarged view of a main part of the third processing unit illustrated in FIG. 9.
Figure 11:
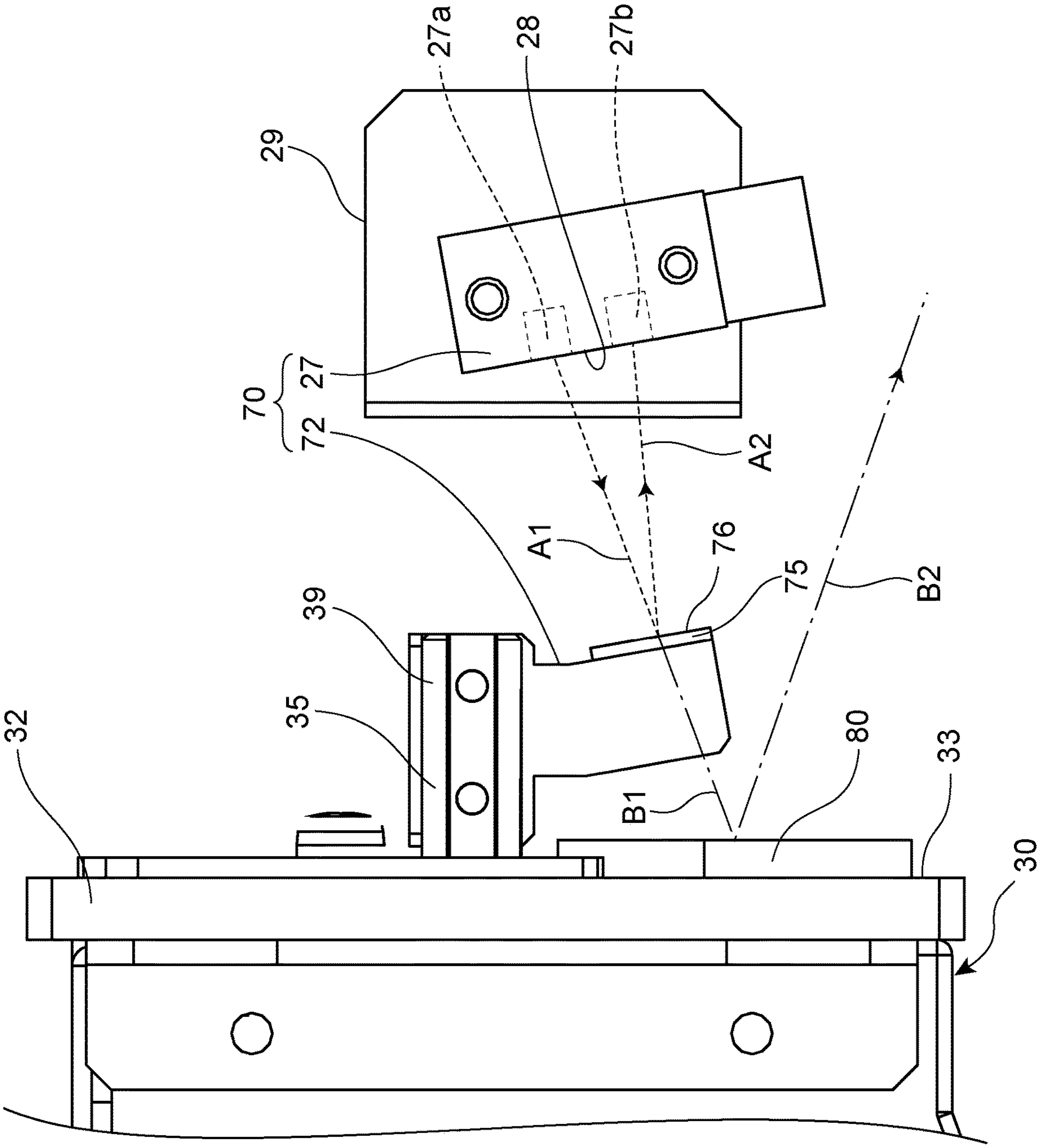
FIG. 11 is a schematic plan view illustrating a state (state in which a reflecting surface faces the detection surface) in which a drive shaft is rotated from the state illustrated in FIG. 10 and a portion-to-be-detected is detected by the rotational position sensor.
Figure 16:
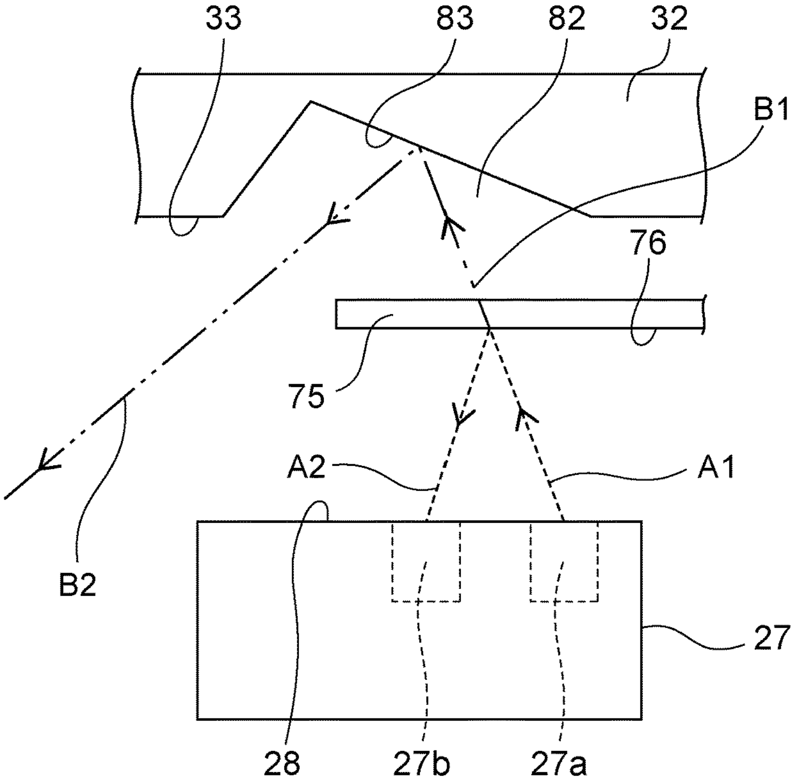
FIG. 16 is a diagram illustrating a third stray light suppressing structure.
Figure 17:
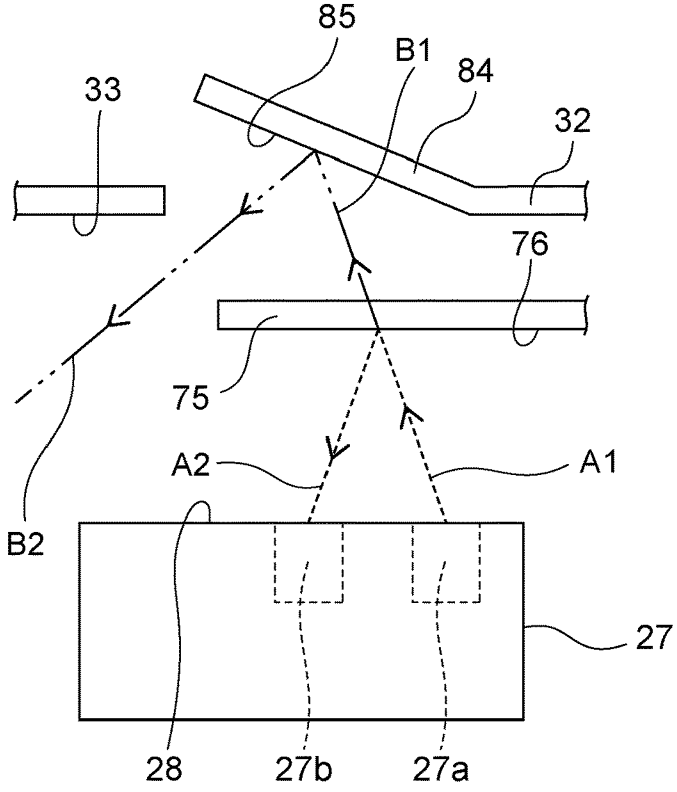
FIG. 17 is a diagram for explaining a fourth stray light suppressing structure.

The rotational position detection unit 70 will be described with reference to FIGS. 4 to 11, 16, and 17. FIG. 4 is a cross-sectional view taken along line Iv-Iv of FIG. 3. FIG. 5 is an enlarged view of a main part of the sheet processing machine illustrated in FIG. 4. FIG. 6 is a perspective view of the main part illustrated in FIG. 5. FIG. 7 is a perspective view of a third processing unit in the sheet processing machine illustrated in FIG. 1. FIG. 8 is an enlarged view of a main part of the third processing unit illustrated in FIG. 7. FIG. 9 is a perspective view of the third processing unit illustrated in FIG. 7 as viewed from the opposite side. FIG. 10 is an enlarged view of a main part of the third processing unit illustrated in FIG. 9. FIG. 11 is a schematic plan view illustrating a state in which the drive shaft 35 is rotated from the state illustrated in FIG. 10 and the portion-to-be-detected 72 is detected by the rotational position sensor 27 (a state in which a reflecting surface 76 faces the detection surface 28). FIG. 16 is a diagram illustrating a third stray light suppressing structure 83. FIG. 17 is a diagram illustrating a fourth stray light suppressing structure 85.

As illustrated in FIGS. 4, 7, and 9, the rotational position detection unit 70 is disposed on the opposite side of the other end side on which the shaft drive motor 14 (not illustrated) is disposed, that is, on one end side of the main body 10. For example, the rotational position detection unit 70 is disposed on the left side of the main body 10 when viewed from the upstream side in the conveyance direction S. As a result, the rotational position detection unit 70 can be prevented from interfering with the shaft drive motor 14. The rotational position detection unit 70 includes the portion-to-be-detected 72 and the rotational position sensor 27. The rotational position sensor 27 is disposed away from the portion-to-be-detected 72.

The portion-to-be-detected 72 is fixed to the one end 39 located on the one end side (left side) of the drive shaft 35 and rotates integrally with the drive shaft 35. The rotational speed of the drive shaft 35 when processing the sheet 2 is very high, but the rotational speed of the drive shaft 35 when detecting the rotational position of the drive shaft 35 is preferably low so that the rotational position of the portion-to-be-detected 72 can be detected. The portion-to-be-detected 72 is, for example, screwed to the one end 39. The portion-to-be-detected 72 is preferably located radially outside the drive shaft 35. As a result, stray light reflected by the end (end surface) of the drive shaft 35 can be suppressed. The portion-to-be-detected 72 has a reflecting portion 75 bent to an L shape. The reflecting portion 75 has a reflecting surface 76 on a side facing the rotational position sensor 27.

The rotational position sensor 27 is supported at the main body side plate 25 by a first stay 29 attached to an installation opening formed in the main body side plate 25. The rotational position sensor 27 is, for example, a reflective optical sensor having a detection surface 28 provided with a pair of a light emitting unit 27*a* and a light receiving unit 27*b*. The light emitting unit 27*a* emits the measurement light A1. The light receiving unit 27*b* receives reflected light A2 obtained by reflecting the measurement light A1 by the reflecting surface 76. The measurement light A1 is, for example, infrared light.

As illustrated in FIG. 11, the detection surface 28 of the rotational position sensor 27 is configured to face the reflecting surface 76 of the reflecting portion 75 in parallel, but to face the unit side surface 33 of the unit side plate 32 in non-parallel. That is, the detection surface 28 intersects with the unit side surface 33 at a certain intersection angle. The unit side surface 33 is a surface of the unit side plate 32 on a side facing the detection surface 28. In the rotational position sensor 27, the reflecting surface 76 of the rotating reflecting portion 75 reflects the measurement light A1 emitted from the light emitting unit 27*a*, and the light receiving unit 27*b* receives the reflected light A2 reflected by the reflecting surface 76, thereby detecting the rotational position of the portion-to-be-detected 72. The non-contact rotational position detection thus can be realized with high accuracy and at low cost. The measurement light A1 that travels as it is without being reflected by the reflecting surface 76 is stray light B1.

The detection surface 28 intersects with the unit side surface 33 at an intersection angle of, for example, 5 to 15 degrees, and intersects at an intersection angle of, for example, 10 degrees. In other words, the detection surface 28 faces the unit side surface 33 in a non-parallel manner so that the stray light B1 does not enter. Thus, the stray light B1 that is not reflected by the reflecting surface 76 can be prevented from entering the light receiving unit 27*b*, and the detection accuracy of the rotational position can be enhanced with a simple configuration. Therefore, the detection surface 28 facing the unit side surface 33 in a non-parallel manner serves as a first stray light suppressing structure.

As illustrated in FIGS. 6, 9, 10, and 11, a low reflecting portion 80 is disposed in the stray light generation region of the unit side surface 33 of the unit side plate 32. The low reflecting portion 80 has low reflectance in the wavelength region of the measurement light A1. The stray light generation region of the unit side surface 33 is a region where the stray light B1 is generated by the incidence and reflection of the measurement light A1 when the reflecting surface 76 of the rotating reflecting portion 75 does not face the detection surface 28.

Since the low reflecting portion 80 absorbs the measurement light A1 from the light emitting unit 27*a* and suppresses reflection, the stray light B1 is prevented from entering the light receiving unit 27*b*, and the detection accuracy of the rotational position can be enhanced with a simple configuration. The low reflecting portion 80 is, for example, a black resin sheet having a foam structure. Examples of other low reflecting portions 80 include a sheet obtained by uniformly densely flocking finely cut black dye fiber groups upright on a base material, and a black coated portion obtained by coating a stray light generation region of the unit side surface 33 in black. The low reflecting portion 80 serves as a second stray light suppressing structure.

In addition, the stray light suppressing structure can be realized by, for example, the following configuration in addition to the configuration in which the detection surface 28 of the rotational position sensor 27 faces the unit side surface 33 of the unit side plate 32 in a non-parallel manner as described above.

As illustrated in FIG. 16, a first inclined surface 83 is disposed on the unit side plate 32 having a thick thickness. The unit side plate 32 is a metal plate having a thickness capable of forming the recess 82, and has a thickness of, for example, 10 mm. The detection surface 28 of the rotational position sensor 27 faces the unit side surface 33 of the unit side plate 32 in parallel. The recess 82 is formed, for example, by cutting on the side of the unit side surface 33 facing the detection surface 28 of the rotational position sensor 27. The recess 82 has the first inclined surface 83 facing the detection surface 28 in a non-parallel manner on the side of the light emitting unit 27*a* of the rotational position sensor 27. The first inclined surface 83 intersects with the detection surface 28 at an intersection angle of, for example, 5 to 15 degrees, and intersects at an intersection angle of, for example, 10 degrees.

When the reflecting surface 76 of the rotating reflecting portion 75 does not face the detection surface 28, the measurement light A1 reaches the unit side plate 32 as stray light B1. However, since the first inclined surface 83 faces the detection surface 28 in a non-parallel manner, the stray light B1 is deviated by the first inclined surface 83 in a direction different from that of the light receiving unit 27*b*. As a result, the stray light B1 can be prevented from becoming the stray light B2 that has been deviated, and the stray light B2 that has been deviated can be prevented from entering the light receiving unit 27*b*, so that the detection accuracy of the rotational position can be enhanced with a simple configuration. Therefore, the structure in which the first inclined surface 83 faces the detection surface 28 in a non-parallel manner serves as a third stray light suppressing structure.

As illustrated in FIG. 17, the bent portion 84 is disposed on the unit side plate 32 having a thin thickness. The unit side plate 32 is a metal plate having a thickness that can be bent processed, and has a thickness of, for example, 2 mm. The detection surface 28 of the rotational position sensor 27 faces the unit side surface 33 of the unit side plate 32 in parallel. The bent portion 84 is bent so as to be away from the detection surface 28 of the rotational position sensor 27. The bent portion 84 has a second inclined surface 85 facing the detection surface 28 in a non-parallel manner on a side of the unit side surface 33 facing the detection surface 28. The second inclined surface 85 intersects with the detection surface 28 at an intersection angle of, for example, 5 to 15 degrees, and intersects at an intersection angle of, for example, 10 degrees.

When the reflecting surface 76 of the rotating reflecting portion 75 does not face the detection surface 28, the measurement light A1 from the light emitting unit 27*a* reaches the unit side plate 32 as stray light B1. However, since the second inclined surface 85 faces the detection surface 28 in a non-parallel manner, the stray light B1 is deviated by the second inclined surface 85 in a direction different from that of the light receiving unit 27*b*. As a result, the stray light B1 can be prevented from becoming the stray light B2 that has been deviated, and the stray light B2 that has been deviated can be prevented from entering the light receiving unit 27*b*, so that the detection accuracy of the rotational position can be enhanced with a simple configuration. Therefore, the structure in which the second inclined surface 85 faces the detection surface 28 in a non-parallel manner serves as a fourth stray light suppressing structure.

(Cause of Occurrence of Positional Shift)

Figure 12:
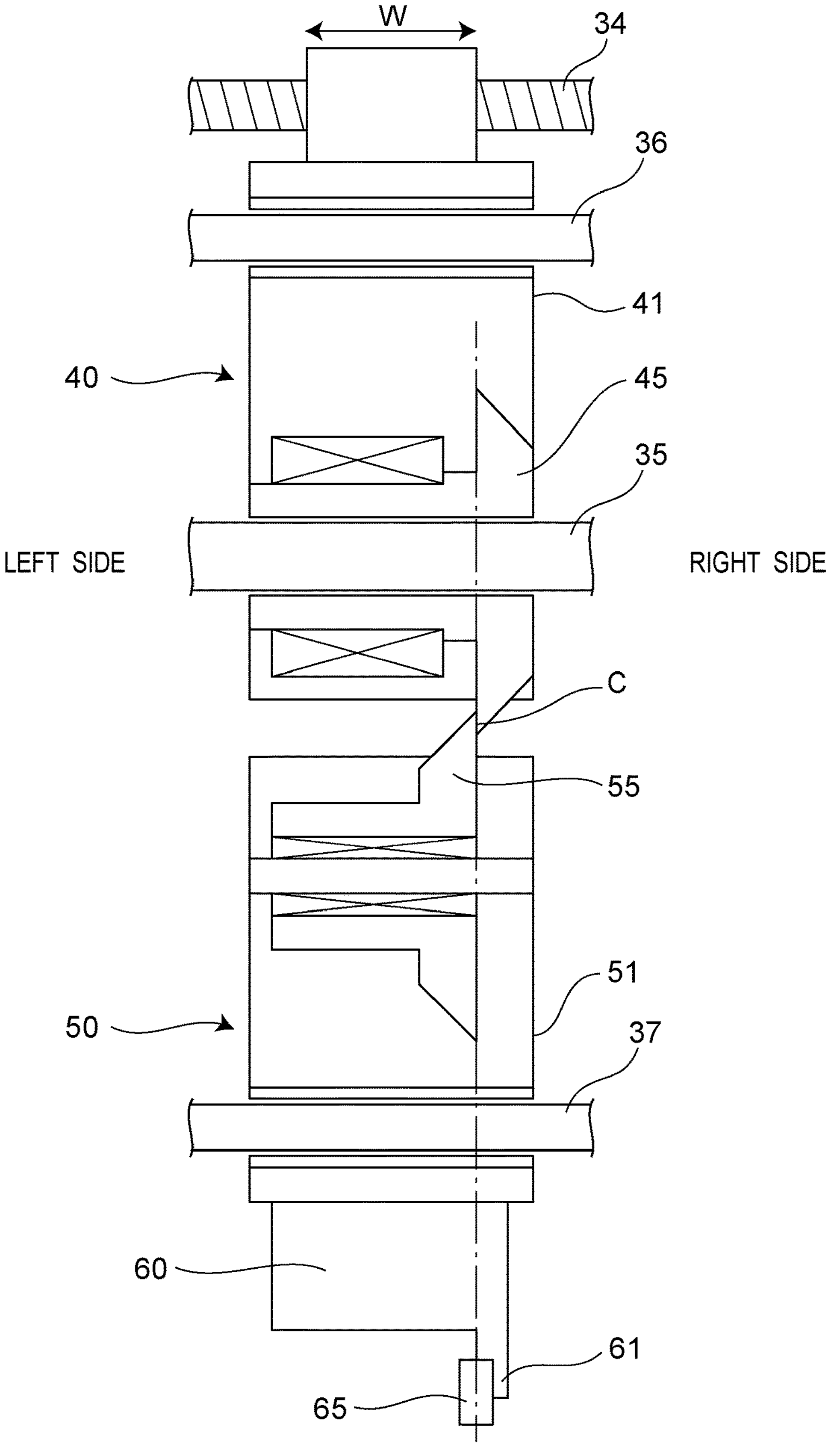
FIG. 12 is a diagram for describing processing reference position detection of the processing device in an ideal state.
Figure 13:
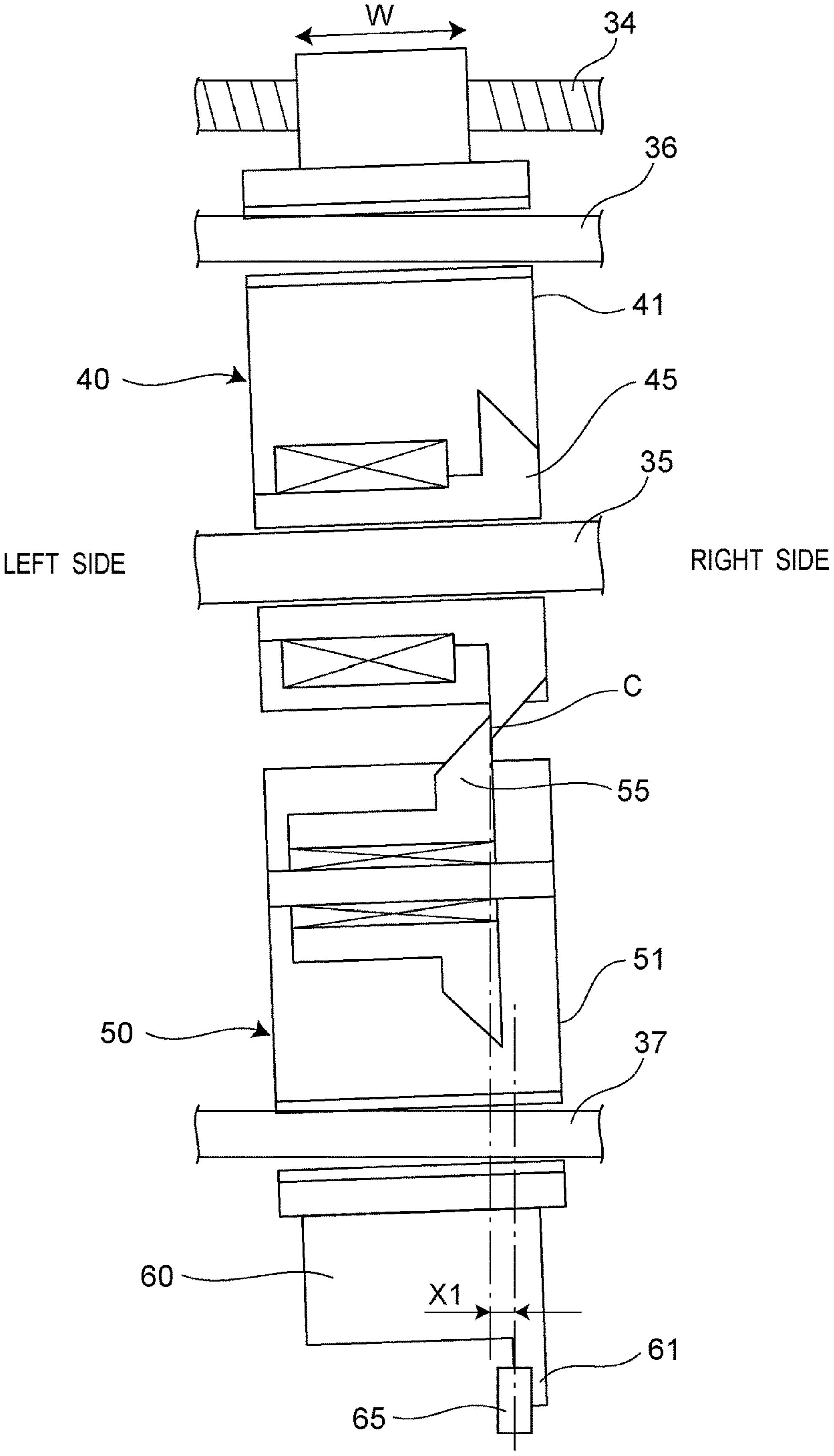
FIG. 13 is a diagram for describing the processing reference position detection of the processing device in a state of being inclined downward to the left.
Figure 14:
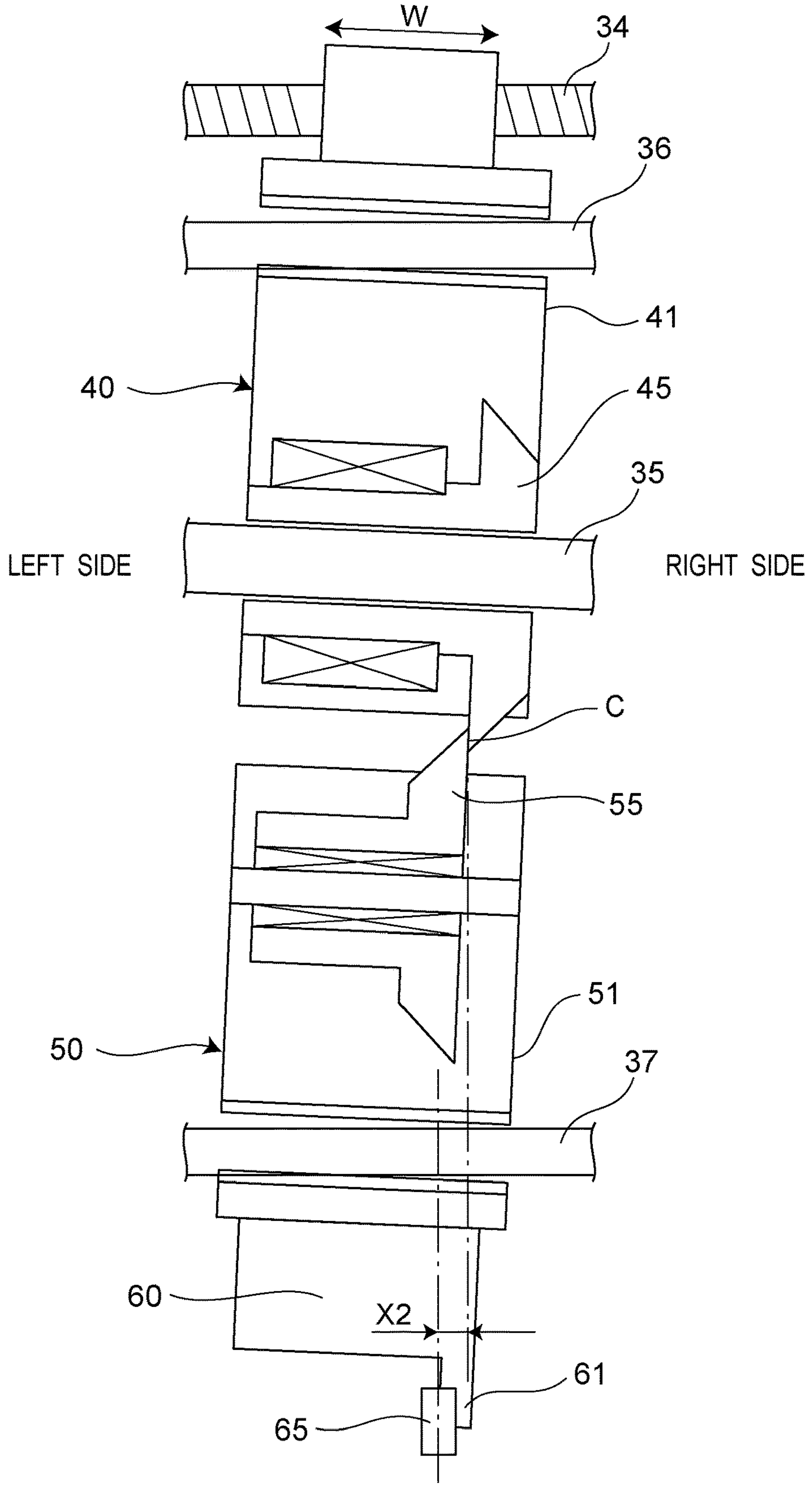
FIG. 14 is a diagram for describing the processing reference position detection of the processing device in a state of being inclined downward to the right.

The cause of occurrence of the positional shift of the processing device 40, 50 has been examined, and thus the description will be given with reference to FIGS. 12 to 14. FIG. 12 is a diagram for describing processing reference position detection of the processing device 40, 50 in an ideal state. FIG. 13 is a diagram for describing the processing reference position detection of the processing device 40, 50 in a state of being inclined downward to the left. FIG. 14 is a diagram for describing the processing reference position detection of the processing device 40, 50 in a state of being inclined downward to the right.

As illustrated in FIG. 12, a case where the drive shaft 35 extends linearly in the width direction W, and the drive shaft 35, the first guide shaft 36, and the second guide shaft 37 are parallel to each other (that is, ideal case) is considered. In this case, the processing acting portion C by the upper processing device 40 and the lower processing device 50 is located on an extension line (illustrated by a one-dot chain line) passing through the reference end 61. That is, both the processing acting portion C and the reference end 61 are located on one extension line illustrated by a one-dot chain line in FIG. 12. One extension line illustrated by a one-dot chain line extends in a direction orthogonal to each extending direction of the drive shaft 35, the first guide shaft 36, and the second guide shaft 37. For example, the reference end 61 located on the extension line is detected by the reference position sensor 65 supported at the main body side plate 25 by the second stay 69. Note that, in order to simplify the description, both the processing acting portion C and the reference end 61 are assumed to be located on one extension line illustrated by the one-dot chain line, but either the processing acting portion C or the reference end 61 may be located at a position shifted from one extension line illustrated by the one-dot chain line.

In the ideal case illustrated in FIG. 12, the rotation of the screw shaft 34 causes the upper processing device 40 and the lower processing device 50 to smoothly move in the width direction W along the first guide shaft 36 and the second guide shaft 37, respectively. The position of the processing acting portion C corresponding to the detection position of the reference end 61 detected by the reference position sensor 65 does not vary depending on the positions in the width direction W of the upper processing device 40 and the lower processing device 50 and the rotational position of the drive shaft 35.

However, as described above, a key groove extending in the width direction W is formed on the outer peripheral surface of the drive shaft 35. When the key groove is processed, slight warpage or distortion occurs in the drive shaft 35. Therefore, practically, the drive shaft 35 hardly extends linearly in the width direction W and is slightly warped.

Although illustrated in an exaggerated manner in FIG. 13, a case where the drive shaft 35 is slightly warped, and the upper processing device 40 and the lower processing device 50 are slightly inclined downward to the left is considered. In this case, the position of the reference position sensor 65 that detects the reference end 61 is fixedly supported at the main body side plate 25, and thus it is not affected by the inclination downward to the left of the upper processing device 40 and the lower processing device 50. However, since the position of the processing acting portion C is affected by the inclination to the downward left of the upper processing device 40 and the lower processing device 50, both the processing acting portion C and the reference end 61 are inhibited from being located on one extension line illustrated by the one-dot chain line as illustrated in FIG. 12. As a result, two extension lines exist, an extension line (illustrated by a one-dot chain line on the left side in FIG. 13) passing through the processing acting portion C and an extension line (illustrated by a one-dot chain line on the right side in FIG. 13) passing through the reference end 61. The two extension lines are, for example, separated by a first distance X1 in the width direction W. Since the first distance X1 in the width direction W varies depending on the rotational position of the drive shaft 35, it is difficult to position, with high accuracy, the processing acting portion C with reference to the detection position of the reference end 61.

Although illustrated in an exaggerated manner in FIG. 14, a case where the drive shaft 35 is slightly warped and the upper processing device 40 and the lower processing device 50 are slightly inclined downward to the right is considered. In this case as well, the position of the reference position sensor 65 that detects the reference end 61 is fixedly supported at the main body side plate 25, and thus it is not affected by the inclination downward to the right of the upper processing device 40 and the lower processing device 50. However, since the position of the processing acting portion C is affected by the inclination to the downward right of the upper processing device 40 and the lower processing device 50, both the processing acting portion C and the reference end 61 are inhibited from being located on one extension line illustrated by the one-dot chain line as illustrated in FIG. 12. As a result, two extension lines exist, an extension line (illustrated by a one-dot chain line on the right side in FIG. 14) passing through the processing acting portion C and an extension line (illustrated by a one-dot chain line on the left side in FIG. 14) passing through the reference end 61. The two extension lines are, for example, separated by a second distance X2 in the width direction W. Since the second distance X2 in the width direction W varies depending on the rotational position of the drive shaft 35, it is difficult to position, with high accuracy, the processing acting portion C with reference to the detection position of the reference end 61.

In practice, the upper processing device 40 and the lower processing device 50 are inclined due to warpage or distortion of the drive shaft 35. Therefore, the position (that is, the position of the processing acting portion C) of the processing blade 45, 55 of the processing device 40, 50 with respect to the detection position of the reference end 61 varies depending on the positions in the width direction W of the processing device 40 and the lower processing device 50 and the rotational position of the drive shaft 35. As a result, the processing blade 45, 55 (that is, the processing acting portion C) of the processing device 40, 50 is prevented from being positioned with high accuracy. Thus, in the present disclosure, the rotational position detection unit 70 detects the rotational position of the drive shaft 35, and the shaft drive motor 14 is controlled such that the drive shaft 35 is at a predetermined rotational position based on the detected rotational position of the drive shaft 35.

The control unit 6 controls the processing device 40, 50 to be positioned at a predetermined processing position in the width direction W while the drive shaft 35 maintains a predetermined rotational position. As a result, the positions in the width direction W of the upper processing device 40 and the lower processing device 50 with the reference end 61 as the processing reference position are not affected by the variation in the rotational position of the drive shaft 35. Therefore, since the processing device 40, 50 is located at the predetermined processing position while the drive shaft 35 maintains the predetermined rotational position, the position of the processing blade 45, 55 of the processing device 40, 50 (that is, the position of the processing acting portion C) is stabilized, so that the processing blade 45, 55 of the processing device 40, 50 can be positioned with high accuracy. Note that the predetermined rotational position can be defined at a certain rotational position in a certain processing device 40, 50, whereas the predetermined rotational position can be defined at another rotational position different from the certain rotational position in another processing device 40, 50.

(Positioning Control of Processing Device)

Figure 15:
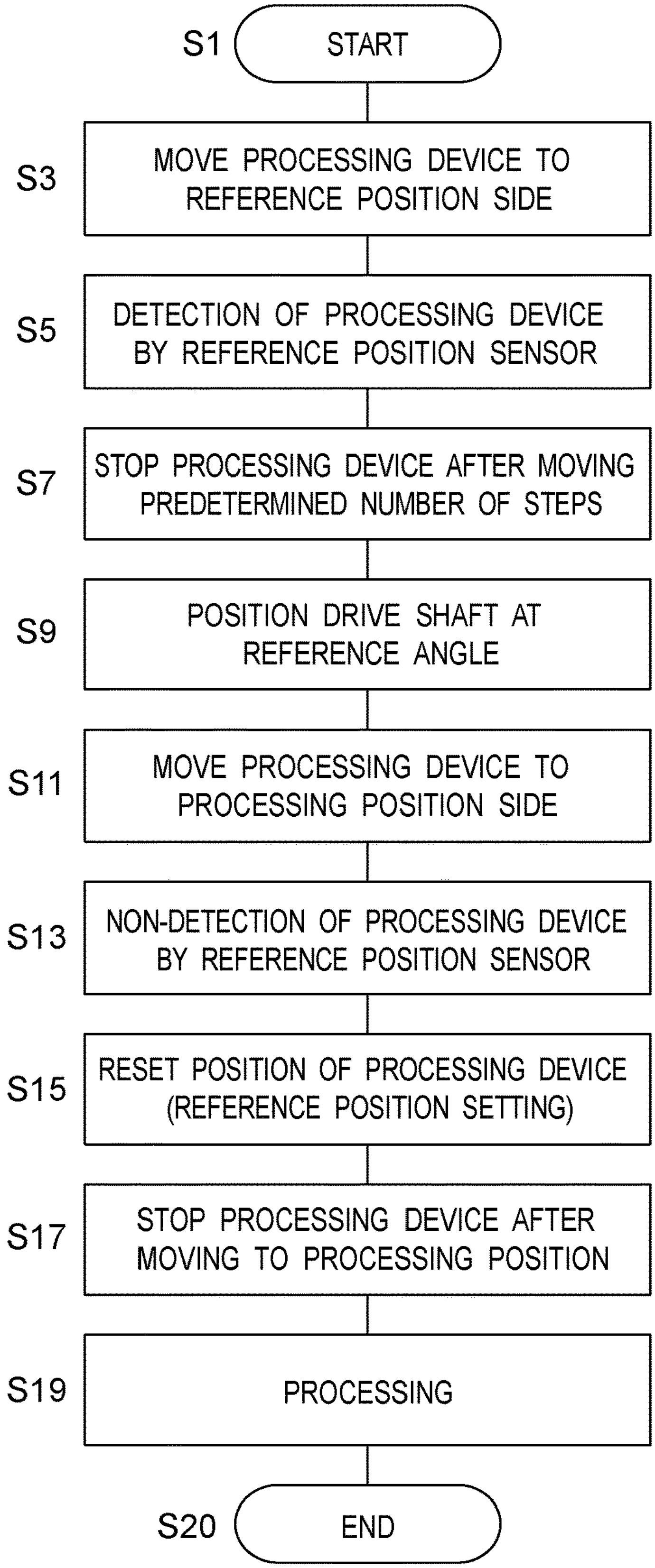
FIG. 15 is a flowchart related to positioning control of the processing device in the sheet processing machine.

Positioning control of the processing device 40, 50 in the sheet processing machine 1 will be described with reference to FIG. 15. FIG. 15 is a flowchart related to positioning control of the processing device 40, 50 in the sheet processing machine 1.

As illustrated in FIG. 15, in step S1, positioning control of the processing device 40, 50 in the sheet processing machine 1 is started. In step S3, the control unit 6 controls the width direction drive motor 13 so that the processing device 40, 50 moves to the reference position side. In step S5, the reference position sensor 65 detects the reference end 61 in the processing device 40, 50. In step S7, the control unit 6 controls the width direction drive motor 13 so that the processing device 40, 50 stops after moving in a predetermined number of steps.

In step S9, the control unit 6 controls the shaft drive motor 14 so that the drive shaft 35 is at a predetermined rotational position. In step S11, the control unit 6 controls the width direction drive motor 13 so that the processing device 40, 50 moves to the processing position side. When the reference position sensor 65 no longer detects the reference end 61 in the processing device 40, 50 in step S13, the control unit 6 resets the position information of the processing device 40, 50 stored in the memory and sets the processing reference position in step S15.

In step S17, the control unit 6 controls the width direction drive motor 13 so that the processing device 40, 50 moves to a predetermined processing position while the drive shaft 35 maintains a predetermined rotational position, and the processing device 40, 50 stops at the predetermined processing position. In step S19, the control unit 6 controls the shaft drive motor 14 so that the processing device 40, 50 performs predetermined processing. When the predetermined processing by the processing device 40, 50 is completed, the positioning control of the processing device 40, 50 in the sheet processing machine 1 is terminated in step S20.

Although specific embodiments of the present disclosure have been described, the present disclosure is not limited to the above embodiment, and various modifications can be made within the scope of the present disclosure. For example, an appropriate combination of the contents described in the above embodiment may be considered as an embodiment of the present disclosure. In addition, the specific numbers shown in the above embodiment are merely examples for facilitating understanding of the present disclosure, and are not to be construed as limiting the present disclosure.

In the above embodiment, the drive shaft 35 for rotationally driving the upper rotary blade 45 for processing the sheet 2 has been exemplified, but in a broad sense, the drive shaft 35 in the present disclosure extends in the width direction W orthogonal to the conveyance direction S and relates to the operation of the processing blade 45. For example, in Japanese Patent Application Laid-Open No. 2013-103311, the present disclosure is also applicable to a cam rotary shaft in a raising/lowering mechanism of a rotary blade in which the rotary blade is separated from and brought into contact with the rotary receiving blade by a cam member that rotates together with a cam rotary shaft (corresponding to a drive shaft of the present disclosure) extending in a width direction. Furthermore, the present disclosure is also applicable to a drive shaft that rotationally drives a rotary receiving blade in Japanese Patent Application Laid-Open No. 2013-103311.

Examples of the processing blade 45, 55 for processing the sheet 2 include perforation processing blades and crease processing blades in addition to the slit processing blades described above.

In the above embodiment, the upper processing device 40 and the lower processing device 50 are integrally configured, and the upper processing device 40 and the lower processing device 50 are integrally moved by moving either one. However, the upper processing device 40 and the lower processing device 50 may be configured independently and may be moved independently. In addition, the upper rotary blade 45 and the lower rotary blade 55 may be rotationally driven by two independent drive shafts. The present disclosure is applicable to each of the two independent drive shafts. In addition, the upper rotary blade 45 may be driven rotated, and only the lower rotary blade 55 may be rotationally driven, and the present disclosure may be applied only to the drive shaft of the lower rotary blade 55.

Figure 18A:
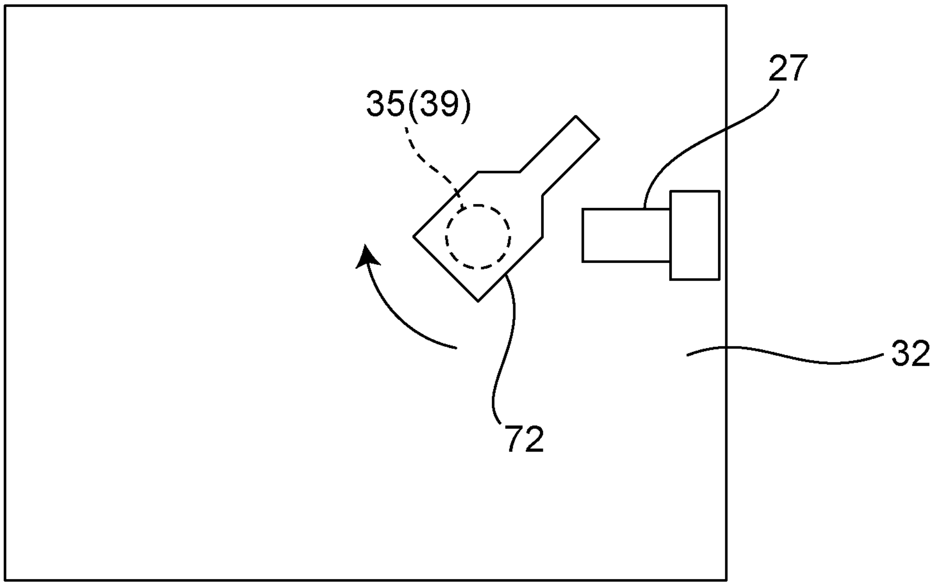
FIG. 18A is a schematic side view for explaining a detection state of a portion-to-be-detected by a transmissive optical sensor acting as a rotational position sensor.
Figure 18B:
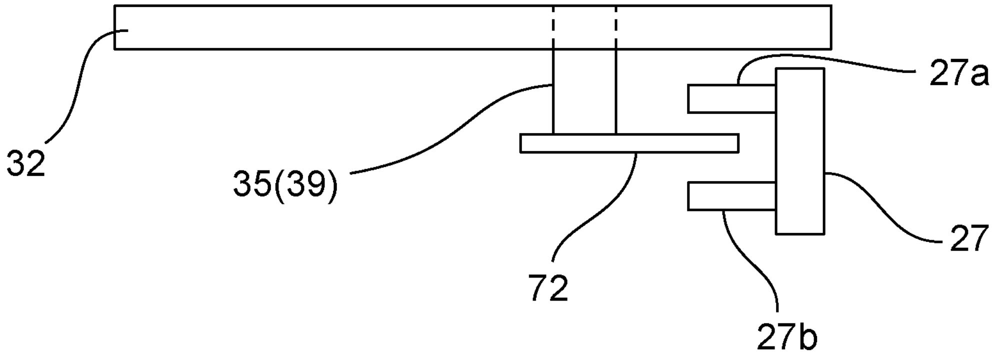
FIG. 18B is a schematic plan view for describing the detection state illustrated in FIG. 18A.

In the above embodiment, the reflective optical sensor is exemplified as the rotational position sensor 27, but a transmissive optical sensor can be used. As illustrated in FIG. 18B, the transmissive optical sensor serving as the rotational position sensor 27 includes a pair of light emitting unit 27*a* and light receiving unit 27*b* disposed opposite to each other. In the rotational position sensor 27, the measurement light emitted from the light emitting unit 27*a* is received by the light receiving unit 27*b*. The rotational position sensor 27 is, for example, attached to the inner side surface of the main body side plate 25 by way of an appropriate fixing member. Note that the rotational position sensor 27 may be attached to the unit side surface 33 of the unit side plate 32 by way of an appropriate fixing member. The portion-to-be-detected 72 is fixed to the end face of the one end 39 of the drive shaft 35 by a fixing member (for example, a screw) not illustrated, and rotates integrally with the drive shaft 35 as illustrated in FIG. 18A. The control unit 6 detects the rotational position of the portion-to-be-detected 72 by blocking the measurement light emitted from the light emitting unit 27*a* toward the light receiving unit 27*b* by the portion-to-be-detected 72, and controls the shaft drive motor 14 so that the rotational position of the drive shaft 35 is at a predetermined rotational position.

Figure 19:
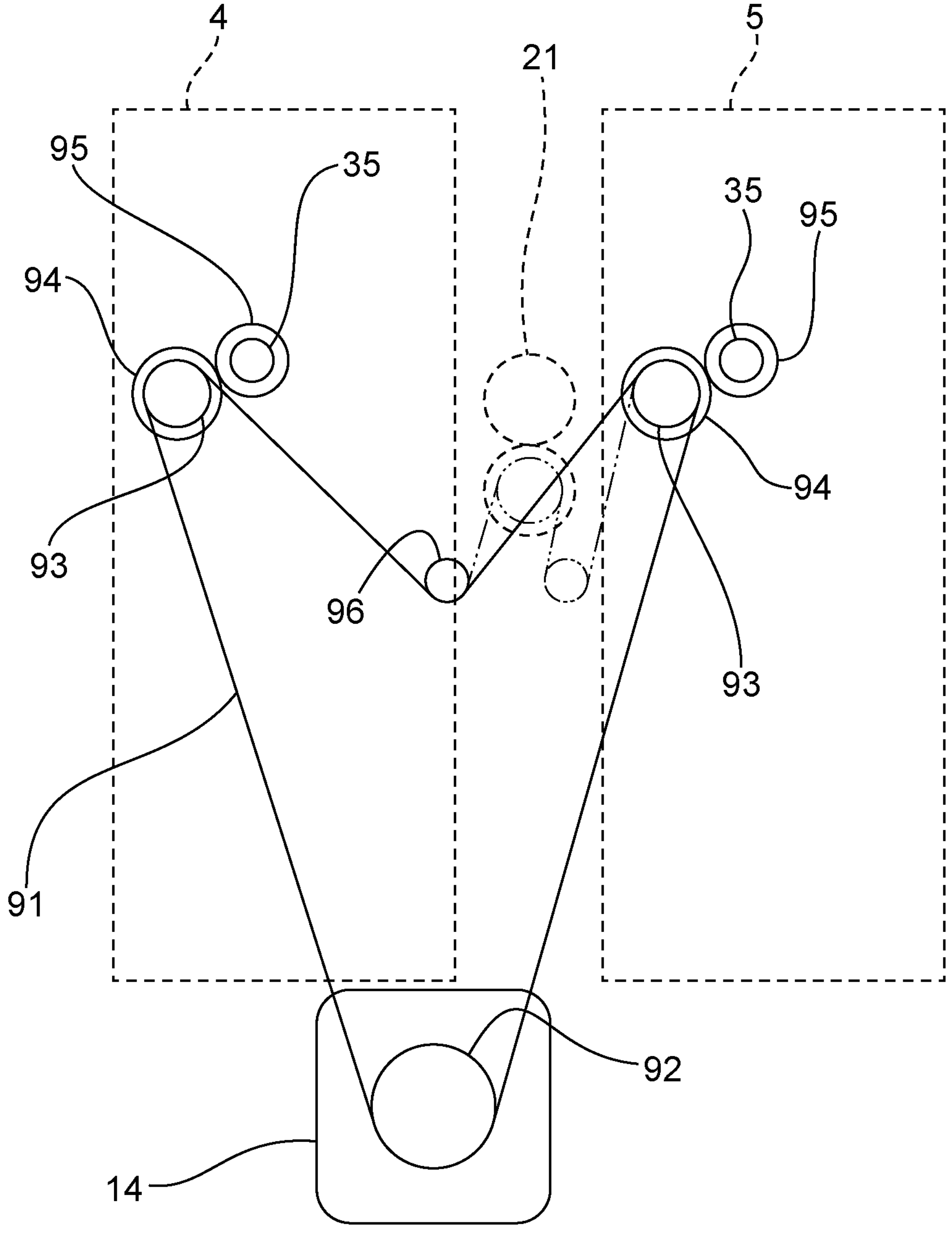
FIG. 19 is a diagram for describing a modified example.

Modified examples will be described with reference to FIGS. 15 and 19.

One corresponding shaft drive motor 14 can be provided for each of the first processing unit 3, the second processing unit 4, and the third processing unit 5 so that the shaft drive motor 14 individually drives each drive shaft 35 of the first processing unit 3, the second processing unit 4, and the third processing unit 5. In addition, the driving force of one shaft drive motor 14 can be configured to drive the drive shafts 35 of the first processing unit 3, the second processing unit 4, and the third processing unit 5 in synchronization through an appropriate drive transmission mechanism. As illustrated in FIG. 19, the appropriate drive transmission mechanism includes, for example, a timing belt 91, pulleys 92 and 93, a drive gear 94, a transmission gear 95, an idler 96, and the like. As an example, positioning control of the processing device 40, 50 in the second processing unit 4 and the third processing unit 5 when one shaft drive motor 14 synchronously drives the drive shafts 35 of the second processing unit 4 and the third processing unit 5 will be described below with reference to FIGS. 15 and 19. However, a detailed description of the control in each step will be omitted.

First, as illustrated in FIG. 15, in step S1, the control unit 6 starts positioning control with respect to the second processing unit 4 and the third processing unit 5. Then, the control unit 6 executes steps S3 to S7. Here, in step S5, the control unit 6 executes steps S9 to S15 with respect to the second processing unit 4 or the third processing unit 5 in which the reference position sensor 65 has detected the reference end 61 first. For example, assuming that the detection of the reference end 61 by the reference position sensor 65 is performed earlier in the second processing unit 4 than in the third processing unit 5, the control unit 6 executes step S7 on the second processing unit 4, and then executes steps S9 to S15. On the other hand, the control unit 6 executes steps S1 to S7 on the third processing unit 5 until the execution of steps S9 to S15 on the second processing unit 4 is completed, and then suspends the execution of steps S9 and subsequent steps. When the execution of step S15 on the second processing unit 4 is completed, the control unit 6 executes step S17 on the second processing unit 4 and resumes the execution of steps S9 to S17 on the third processing unit 5 that has been suspended. The control unit 6 executes step S17 on the second processing unit 4 and the third processing unit 5, and then executes step S19 and subsequent steps. According to such positioning control, the processing device 40, 50 can be positioned in as short a time as possible even if the plurality of drive shafts 35 are synchronously driven by one shaft drive motor 14. Note that the drive transmission mechanism can also be configured to synchronously drive the rollers 21 disposed between the second processing unit 4 and the third processing unit 5 in addition to the synchronous drive of the drive shafts 35 (illustrated by a two-dot chain line in FIG. 19). In this case, the shaft drive motor 14 also serves as a sheet conveyance drive source.

The present disclosure and embodiments are summarized as follows.

A sheet processing machine 1 according to an aspect of the present disclosure is the sheet processing machine 1 that processes a sheet 2 while conveying the sheet 2 in a conveyance direction S, the sheet processing machine 1 including:

a processing device 40, 50 having a processing blade 45, 55;

a drive shaft 35 that extends in a width direction W orthogonal to the conveyance direction S and is related to operation of the processing blade 45, 55;

a shaft drive motor 14 that drives the drive shaft 35;

a rotational position detection unit 70 that detects a rotational position of the drive shaft 35;

a width direction drive motor 13 that moves the processing device 40, 50 in the width direction W; and a control unit 6 that controls operations of the shaft drive motor 14 and the width direction drive motor 13, in which the control unit 6 controls the shaft drive motor 14 so that the drive shaft 35 is at a predetermined rotational position based on the rotational position of the drive shaft 35 detected by the rotational position detection unit 70, and controls the width direction drive motor 13 so that the processing device 40, 50 moves to a predetermined processing position while the drive shaft 35 maintains the predetermined rotational position.

According to the above configuration, since the processing device 40, 50 is located at the predetermined processing position while the drive shaft 35 maintains the predetermined rotational position, the position of the processing blade 45, 55 of the processing device 40, 50 is stabilized, so that the processing blade 45, 55 of the processing device 40, 50 can be positioned with high accuracy.

Furthermore, in the sheet processing machine 1 of one embodiment, the processing device 40, 50 has a reference end 61 serving as a processing reference position when moving in the width direction W, and the width direction drive motor 13 moves the processing device 40, 50 based on the processing reference position.

According to the above configuration, the processing device 40, 50 can be moved in the width direction W with high accuracy.

Furthermore, in the sheet processing machine 1 of one embodiment, the rotational position detection unit 70 includes:

a portion-to-be-detected 72 fixed to one end 39 of the drive shaft 35 and located radially outside of the drive shaft 35; and a rotational position sensor 27 that detects a rotational position of the portion-to-be-detected 72.

According to the above configuration, stray light reflected by the end (end surface) of the drive shaft 35 can be suppressed.

Furthermore, in the sheet processing machine 1 of one embodiment, the portion-to-be-detected 72 includes a reflecting surface 76, the rotational position sensor 27 is a reflective optical sensor having a detection surface 28 provided with a light emitting unit 27*a* that emits a measurement light A1 and a light receiving unit 27*b* that receives the reflected light A2 obtained by reflecting the measurement light A1 by the reflecting surface 76, and the reflecting surface 76 is configured to face the detection surface 28 in a spaced apart manner.

According to the above configuration, non-contact rotational position detection can be realized with high accuracy and at low cost.

Furthermore, in the sheet processing machine 1 of one embodiment, stray light suppressing structures 28, 80, 83, and 85 that prevent the stray light B1 not reflected by the reflecting surface 76 from entering the light receiving unit 27*b* are provided.

According to the above configuration, the detection accuracy of the rotational position can be enhanced.

Furthermore, in the sheet processing machine 1 of one embodiment, the stray light suppressing structure 28 is the detection surface 28 that faces, in a non-parallel manner, a unit side surface 33 of a unit side plate 32 supporting the drive shaft 35.

According to the above configuration, the detection accuracy of the rotational position can be enhanced with a simple configuration.

Furthermore, in the sheet processing machine 1 of one embodiment, the stray light suppressing structure 80 is a low reflecting portion 80 which is disposed on the unit side surface 33 of the unit side plate 32 supporting the drive shaft 35 and has a low reflectance in the wavelength region of the measurement light A1.

According to the above configuration, the detection accuracy of the rotational position can be enhanced with a simple configuration.

Furthermore, in the sheet processing machine 1 of one embodiment, the stray light suppressing structures 83 and 85 are inclined surfaces 83 and 85 which are disposed on the unit side surface 33 of the unit side plate 32 supporting the drive shaft 35 and face the detection surface 28 in a non-parallel manner.

According to the above configuration, the detection accuracy of the rotational position can be enhanced with a simple configuration.

What is claimed is:

1. A sheet processing machine that processes a sheet while conveying the sheet in a conveyance direction, the sheet processing machine comprising:

a processing device including a rotary processing blade;

a drive shaft that extends in a width direction orthogonal to the conveyance direction and is driven to rotate the rotary processing blade;

a shaft drive motor that drives the drive shaft;

a rotational position detector that detects a rotational position of the drive shaft;

a width direction drive motor that moves the processing device in the width direction; and a control unit that controls operations of the shaft drive motor and the width direction drive motor, wherein the control unit controls the shaft drive motor so that the drive shaft is at a predetermined rotational position based on the rotational position of the drive shaft detected by the rotational position detection unit, and controls the width direction drive motor so that the processing device moves to a predetermined processing position while the drive shaft maintains the predetermined rotational position.

2. The sheet processing machine according to claim 1, wherein the processing device has a reference end serving as a processing reference position when moving in the width direction, and the width direction drive motor moves the processing device based on the processing reference position.

3. The sheet processing machine according to claim 2, wherein the rotational position detector includes:

a portion-to-be-detected fixed to one end of the drive shaft and located radially outside of the drive shaft; and a rotational position sensor that detects a rotational position of the portion-to-be-detected.

4. The sheet processing machine according to claim 3, wherein the portion-to-be-detected includes a reflecting surface, the rotational position sensor is a reflective optical sensor having a detection surface provided with a light emitting unit that emits a measurement light and a light receiving unit that receives a reflected light obtained by reflecting the measurement light by the reflecting surface, and the reflecting surface is configured to face the detection surface in a spaced apart manner.

5. The sheet processing machine according to claim 1, wherein the rotational position detector includes:

a portion-to-be-detected fixed to one end of the drive shaft and located radially outside of the drive shaft; and a rotational position sensor that detects a rotational position of the portion-to-be-detected.

6. The sheet processing machine according to claim 5, wherein the portion-to-be-detected includes a reflecting surface, the rotational position sensor is a reflective optical sensor having a detection surface provided with a light emitting unit that emits a measurement light and a light receiving unit that receives a reflected light obtained by reflecting the measurement light by the reflecting surface, and the reflecting surface is configured to face the detection surface in a spaced apart manner.

7. A sheet processing machine that processes a sheet while conveying the sheet in a conveyance direction, the sheet processing machine comprising:

a processing device including a rotary processing blade;

a drive shaft that extends in a width direction orthogonal to the conveyance direction and is driven to rotate the rotary processing blade;

a shaft drive motor that drives the drive shaft;

a rotational position detector that detects a rotational position of the drive shaft;

a width direction drive motor that moves the processing device in the width direction; and a control unit that controls operations of the shaft drive motor and the width direction drive motor, wherein the control unit controls the shaft drive motor so that the drive shaft is at a predetermined rotational position based on the rotational position of the drive shaft detected by the rotational position detector, and controls the width direction drive motor so that the processing device moves to a predetermined processing position while the drive shaft maintains the predetermined rotational position, the rotational position detector includes:

a portion-to-be-detected fixed to one end of the drive shaft and located radially outside of the drive shaft; and a rotational position sensor that detects a rotational position of the portion-to-be-detected, the portion-to-be-detected includes a reflecting surface, the rotational position sensor is a reflective optical sensor having a detection surface provided with a light emitting unit that emits a measurement light and a light receiving unit that receives a reflected light obtained by reflecting the measurement light by the reflecting surface, and the reflecting surface is configured to face the detection surface in a spaced apart manner, the sheet processing machine further comprise a stray light suppressor that prevents stray light not reflected by the reflecting surface from entering the light receiving unit.

8. The sheet processing machine according to claim 7, wherein the stray light suppressor is the detection surface that faces, in a non-parallel manner, a unit side surface of a unit side plate supporting the drive shaft.

9. The sheet processing machine according to claim 7, wherein the stray light suppressor is a low reflecting portion which is disposed on the unit side surface of the unit side plate supporting the drive shaft and has a low reflectance in the wavelength region of the measurement light.

10. The sheet processing machine according to claim 7, wherein the stray light suppressor is an inclined surface that is disposed on a unit side surface of a unit side plate supporting the drive shaft and faces the detection surface in a non-parallel manner.

11. A sheet processing machine that processes a sheet while conveying the sheet in a conveyance direction, the sheet processing machine comprising:

a processing device including a rotary processing blade;

a drive shaft that extends in a width direction orthogonal to the conveyance direction and is driven to rotate the rotary processing blade;

a shaft drive motor that drives the drive shaft;

a rotational position detector that detects a rotational position of the drive shaft;

a width direction drive motor that moves the processing device in the width direction; and a control unit that controls operations of the shaft drive motor and the width direction drive motor, a stray light suppressing structure that prevents stray light not reflected by the reflecting surface from entering the light receiving unit, the processing device has a reference end serving as a processing reference position when moving in the width direction, and the width direction drive motor moves the processing device based on the processing reference position, the rotational position detector includes:

a portion-to-be-detected fixed to one end of the drive shaft and located radially outside of the drive shaft; and a rotational position sensor that detects a rotational position of the portion-to-be-detected, the portion-to-be-detected includes a reflecting surface, the rotational position sensor is a reflective optical sensor having a detection surface provided with a light emitting unit that emits a measurement light and a light receiving unit that receives a reflected light obtained by reflecting the measurement light by the reflecting surface, and the reflecting surface is configured to face the detection surface in a spaced apart manner, the sheet processing machine further comprise a stray light suppressor that prevents stray light not reflected by the reflecting surface from entering the light receiving unit.

12. The sheet processing machine according to claim 11, wherein the stray light suppressor is the detection surface that faces, in a non-parallel manner, a unit side surface of a unit side plate supporting the drive shaft.

13. The sheet processing machine according to claim 11, wherein the stray light suppressor is a low reflecting portion which is disposed on the unit side surface of the unit side plate supporting the drive shaft and has a low reflectance in the wavelength region of the measurement light.

14. The sheet processing machine according to claim 11, wherein the stray light suppressor is an inclined surface that is disposed on a unit side surface of a unit side plate supporting the drive shaft and faces the detection surface in a non-parallel manner.

* * * * *